(12) United States Patent
Peng et al.

(10) Patent No.: US 12,298,616 B2
(45) Date of Patent: May 13, 2025

(54) DISPLAY PANEL, PREPARATION METHOD THEREOF, AND DISPLAY APPARATUS

(71) Applicants: Beijing BOE Technology Development Co., Ltd., Beijing (CN); BOE Technology Group Co., Ltd., Beijing (CN)

(72) Inventors: Yidan Peng, Beijing (CN); Long Wang, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/274,728

(22) PCT Filed: Jul. 27, 2022

(86) PCT No.: PCT/CN2022/108305
§ 371 (c)(1),
(2) Date: Jul. 28, 2023

(87) PCT Pub. No.: WO2024/020873
PCT Pub. Date: Feb. 1, 2024

(65) Prior Publication Data
US 2025/0020954 A1    Jan. 16, 2025

(51) Int. Cl.
*G02F 1/1335* (2006.01)

(52) U.S. Cl.
CPC .. *G02F 1/133512* (2013.01); *G02F 1/133553* (2013.01); *G02F 2201/123* (2013.01)

(58) Field of Classification Search
CPC ......... G02F 1/133512; G02F 1/133553; G02F 2201/123; G02F 1/133342
See application file for complete search history.

(56) References Cited

U.S. PATENT DOCUMENTS

| | | | | |
|---|---|---|---|---|
| 2005/0225705 A1* | 10/2005 | Chae | ................ | G02F 1/133555 349/114 |
| 2008/0036953 A1* | 2/2008 | Otake | ............... | G02F 1/133555 349/114 |
| 2013/0299808 A1 | 11/2013 | Sugimoto et al. | | |
| 2015/0194467 A1* | 7/2015 | Zhang | ................ | H10H 29/142 257/13 |

(Continued)

FOREIGN PATENT DOCUMENTS

| | | |
|---|---|---|
| CN | 103329625 A | 9/2013 |
| CN | 104865731 A | 8/2015 |

(Continued)

*Primary Examiner* — Mariam Qureshi
(74) *Attorney, Agent, or Firm* — Ling Wu; Stephen Yang; Ling and Yang Intellectual Property

(57) ABSTRACT

The present disclosure provides a display panel, a preparation method thereof and a display apparatus. The display panel includes at least one display unit including at least one first pixel region, at least one second pixel region and at least one light transmitting region, the first pixel region is configured to display an image on a first side of the display panel; the second pixel region is configured to display an image on a second side of the display panel; and the light transmitting region is configured to transmit light.

23 Claims, 7 Drawing Sheets

(56) References Cited

U.S. PATENT DOCUMENTS

| | | |
|---|---|---|
| 2017/0176813 A1 | 6/2017 | Chen et al. |
| 2021/0286218 A1 | 9/2021 | Yu |
| 2021/0359272 A1 | 11/2021 | Li et al. |

FOREIGN PATENT DOCUMENTS

| | | |
|---|---|---|
| CN | 106990596 A | 7/2017 |
| CN | 110612607 A | 12/2019 |
| CN | 110750011 A | 2/2020 |
| CN | 113156682 A | 7/2021 |
| CN | 113176684 A | 7/2021 |
| CN | 113238415 A | 8/2021 |
| CN | 113534520 A | 10/2021 |
| JP | 2001305306 A | 10/2001 |
| KR | 20060130336 A | 12/2006 |

* cited by examiner

DISPLAY PANEL, PREPARATION METHOD THEREOF, AND DISPLAY APPARATUS

CROSS-REFERENCE TO RELATED APPLICATION

The present application is a U.S. National Phase Entry of International Application No. PCT/CN2022/108305 having an international filing date of Jul. 27, 2022, the content of which is incorporated into this application by reference.

TECHNICAL FIELD

The present disclosure relates to, but is not limited to the field of display technology, in particular to a display panel and a method for preparing the display panel, and a display apparatus.

BACKGROUND

With the development of display technology, the functions of display apparatuses are becoming more and more abundant, and applications of display apparatuses are becoming more and more extensive. For example, transparent display apparatuses have been gradually applied in application scenarios, such as, vehicle display, window display, furniture display and wearable display.

In an existing transparent display apparatus, it is necessary to provide a shield layer in the display region of the display apparatus, which plays the role of light shielding, however it will absorb a lot of light and affect the brightness and contrast of the display apparatus.

SUMMARY

The following is a summary of subject matters described herein in detail. The summary is not intended to limit the protection scope of claims.

In one aspect, the present disclosure provides a display panel including at least one display unit. The at least one display unit includes at least one first pixel region, at least one second pixel region and at least one light transmitting region. A first pixel region is configured to display an image on a first side of the display panel; a second pixel region is configured to display an image on a second side of the display panel; and a light transmitting region is configured to transmit light.

The at least one display unit includes:
a first base, located in the first pixel region, the second pixel region and the light transmitting region;
a second base, disposed opposite to the first base and located in the first pixel region, the second pixel region and the light transmitting region;
a light adjusting film layer, disposed between the first base and the second base and located in the first pixel region, the second pixel region and the light transmitting region;
at least one first light shield pattern, disposed on a side of the first base close to the light adjusting film layer and located in the first pixel region;
at least one first pixel electrode, disposed on a side of the first light shield pattern close to the light adjusting film layer and located in the first pixel region, wherein an orthographic projection of the at least one first light shield pattern overlaps with an orthographic projection of the at least one first pixel electrode on the first base;
at least one second pixel electrode, disposed on a side of the first base close to the light adjusting film layer and located in the second pixel region;
at least one second light shield pattern, disposed on a side of the second base close to the light adjusting film layer and located in the second pixel region, wherein an orthographic projection of the at least one second light shield pattern overlaps with an orthographic projection of the at least one second pixel electrode on the first base; and
at least one common electrode, disposed on a side of the second light shield pattern close to the light adjusting film layer and located in the first pixel region, the second pixel region and the light transmitting region, wherein an orthographic projection of the at least one common electrode overlaps with each of orthographic projections of the at least one first pixel electrode and the at least one second pixel electrode on the first base.

In an exemplary embodiment, the at least one first light shield pattern includes a first light shield material layer and a first reflective layer, the first reflective layer is located on a side of the first light shield material layer close to the light adjusting film layer, and the first reflective layer is configured to emit incident light towards a direction of the light adjusting film layer; the first light shield material layer is configured to shield ambient light reflected by the first reflective layer.

In an exemplary embodiment, the first reflective layer extends along a first direction, the first reflective layer has a first edge and a second edge disposed oppositely in a second direction, the first pixel electrode extends along the first direction, the first pixel electrode has a third edge and a fourth edge disposed oppositely in the second direction, the first edge and the third edge are disposed on a same side, the second edge and the fourth edge are disposed on a same side, the first edge protrudes from the third edge in the second direction, the second edge protrudes from the fourth edge in the second direction, and the first direction intersects with the second direction.

In an exemplary embodiment, a first distance is formed between the first edge and the third edge, and the first distance is greater than or equal to 5 microns.

In an exemplary embodiment, a second distance is formed between the second edge and the fourth edge, and the second distance is greater than or equal to 5 microns.

In an exemplary embodiment, the first reflective layer extends along a first direction, the first reflective layer has a first edge and a second edge disposed oppositely in a second direction, the first light shield material layer extends along the first direction, the first light shield material layer has a fifth edge and a sixth edge disposed oppositely in the second direction, the first edge and the fifth edge are disposed on a same side, the second edge and the sixth edge are disposed on a same side, the fifth edge protrudes from the first edge in the second direction, the sixth edge protrudes from the second edge in the second direction, and the first direction intersects with the second direction.

In an exemplary embodiment, a third distance is formed between the fifth edge and the first edge, and the third distance is greater than or equal to 5 microns In an exemplary embodiment, a fourth distance is formed between the sixth edge and the second edge, and the fourth distance is greater than or equal to 5 microns.

In an exemplary embodiment, the first reflective layer extends along a first direction, the first reflective layer has a first edge and a second edge disposed oppositely in a second direction, the first light shield material layer extends along the first direction, the first light shield material layer has a fifth edge and a sixth edge disposed oppositely in the second direction, the first edge and the fifth edge are disposed on a same side, the second edge and the sixth edge are disposed on a same side, the first edge protrudes from the fifth edge in the second direction, the sixth edge protrudes from the second edge in the second direction, and the first direction intersects with the second direction.

In an exemplary embodiment, the first reflective layer extends along a first direction, the first reflective layer has a first edge and a second edge disposed oppositely in a second direction, the first light shield material layer includes a first sub-light shield material layer and a second sub-light shield material layer both extending along the first direction, the first sub-light shield material layer and the second sub-light shield material layer are disposed at intervals along the second direction, the first sub-light shield material layer has a seventh edge on a side away from the second sub-light shield material layer, the second sub-light shield material layer has an eighth edge on a side away from the first sub-light shield material layer, the first edge and the seventh edge are disposed on a same side, the second edge and the eighth edge are on a same side, the seventh edge protrudes from the first edge in the second direction, and the eighth edge protrudes from the second edge in the second direction, and the first direction intersects with the second direction.

In an exemplary embodiment, a surface of the first reflective layer on a side close to the light adjusting film layer is planar.

In an exemplary embodiment, a surface of the first reflective layer close to the light adjusting film layer is a concave-convex surface.

In an exemplary embodiment, the first reflective layer includes multiple metal particles forming the concave-convex surface on a side of the first reflective layer close to the light adjusting film layer.

In an exemplary embodiment, a shape of the multiple metal particles includes at least one of a sphere, a cylinder, a prism, and a pyramid.

In an exemplary embodiment, the at least one first light shield pattern further includes a first dielectric material layer disposed between the first light shield material layer and the first reflective layer.

In an exemplary embodiment, the at least one display unit includes multiple first pixel electrodes and multiple second pixel electrodes, the multiple first pixel electrodes and the multiple second pixel electrodes are all in a line shape, the multiple first pixel electrodes and the multiple second pixel electrodes are all extended along a first direction, the multiple first pixel electrodes and the multiple second pixel electrodes are alternately disposed along a second direction to form an interdigital structure, and the first direction intersects with the second direction.

In an exemplary embodiment, the invention further includes at least one first signal line disposed on the first base, the at least one first signal line extends along the second direction, and the at least one first signal line is connected to the multiple first pixel electrodes.

In an exemplary embodiment, the at least one first signal line and the multiple first pixel electrodes are located in different film layers, and the at least one first signal line is connected to the multiple first pixel electrodes through a first via hole.

In an exemplary embodiment, the invention further includes at least one second signal line disposed on the first base, the at least one second signal line extends along the second direction, and the at least one second signal line is connected to the multiple second pixel electrodes.

In an exemplary embodiment, the at least one second signal line and the multiple second pixel electrodes are located in different film layers, and the at least one second signal line is connected to the multiple second pixel electrodes through a second via hole.

In an exemplary embodiment, the present disclosure further includes at least one first connection electrode disposed on the first base, the at least one first connection electrode extends along the second direction, and the at least one first connection electrode is connected to the multiple first pixel electrodes.

In an exemplary embodiment, the invention further includes at least one second connection electrode disposed on the first base, the at least one second connection electrode extends along the second direction, and the at least one second connection electrode is connected to the multiple second pixel electrodes.

In an exemplary embodiment, the at least one display unit includes multiple common electrodes, all of which are in a line shape and extend along a second direction, and the multiple common electrodes are disposed at intervals along a first direction, and the first direction intersects with the second direction.

In an exemplary embodiment, the invention further includes at least one third connection electrode disposed on the second base, the at least one third connection electrode extends along the first direction, and the at least one third connection electrode is connected to the multiple common electrodes.

In an exemplary embodiment, the display panel includes multiple display units that share at least one common electrode.

In an exemplary embodiment, the display panel includes multiple display units, the display units are rectangular, and a distance between edges of adjacent display units is 1 mm to 2 mm.

In an exemplary embodiment, the display panel includes a display region, a peripheral region and a bonding region that are disposed outside the display region, and the display panel further includes a first conductive layer, a second conductive layer and a conductive adhesive layer, wherein the first conductive layer is disposed on the first base and located in the peripheral region, the second conductive layer is disposed on the second base and located in the peripheral region, the first conductive layer is disposed opposite to the second conductive layer, the conductive adhesive layer is disposed between the first conductive layer and the second conductive layer, the at least one common electrode is connected with the second conductive layer, and the first conductive layer is connected with the bonding region.

In an exemplary embodiment, the first conductive layer includes a metal layer and a first conductive film layer that are stacked, and the metal layer is located on a side of the first conductive film layer close to the first base.

In an exemplary embodiment, the metal layer is strip-shaped, the metal layer is located in an edge region of the first base, and the metal layer is provided with spacing in a corner region of the first base; or, the metal layer is annular, and the metal layer is disposed around periphery of the display region.

In an exemplary embodiment, multiple through holes are provided in the metal layer.

In an exemplary embodiment, the second light shield pattern includes a second light shield material layer and a second reflective layer, the second reflective layer is located on a side of the second light shield material layer close to the light adjusting film layer, and the second reflective layer is configured to emit incident light towards a direction of the light adjusting film layer; and the second light shield material layer is configured to shield ambient light reflected by the second reflective layer.

In another aspect, a display apparatus is provided, including the aforementioned display panel.

In another aspect, the present disclosure further provides a method for preparing a display panel. The display panel includes at least one display unit including at least one first pixel region, at least one second pixel region and at least one light transmitting region. A first pixel region is configured to display an image on a first side of the display panel; a second pixel region is configured to display an image on a second side of the display panel; a light transmitting region is configured to transmit light. The method for preparing the display panel includes:

forming at least one first light shield pattern on the first base, to enable the at least one first light shield pattern to be located in the first pixel region;

forming at least one first pixel electrode on a side of the at least one first light shield pattern away from the first base, to enable the at least one first pixel electrode to be located in the first pixel region, wherein an orthographic projection of the at least one first light shield pattern overlaps with an orthographic projection of the at least one first pixel electrode on the first base;

forming at least one second pixel electrode on the first base, to enable the at least one second pixel electrode to be located in the second pixel region;

forming at least one second light shield pattern on the second base, to enable the at least one second light shield pattern to be located in the second pixel region, wherein an orthographic projection of the at least one second light shield pattern overlaps with an orthographic projection of the at least one second pixel electrode on the first base;

forming at least one common electrode on a side of the second light shield pattern away from the second base, to enable the at least one common electrode to be located in the first pixel region, the second pixel region and the light transmitting region, wherein an orthographic projection of the at least one common electrode overlaps with each of orthographic projections of the at least one first pixel electrode and the at least one second pixel electrode on the first base;

cell aligning the first base with the second base; and forming a light adjusting film layer between the first base and the second base.

Other aspects will become apparent upon reading and understanding of the accompanying drawings and the detailed description.

BRIEF DESCRIPTION OF DRAWINGS

Accompanying drawings are used for providing an understanding for technical solutions of the present application and form a part of the specification, are used for explaining the technical solutions of the present application together with embodiments of the present application, and do not constitute a limitation on the technical solutions of the present application.

DETAILED DESCRIPTION

Figure 1:
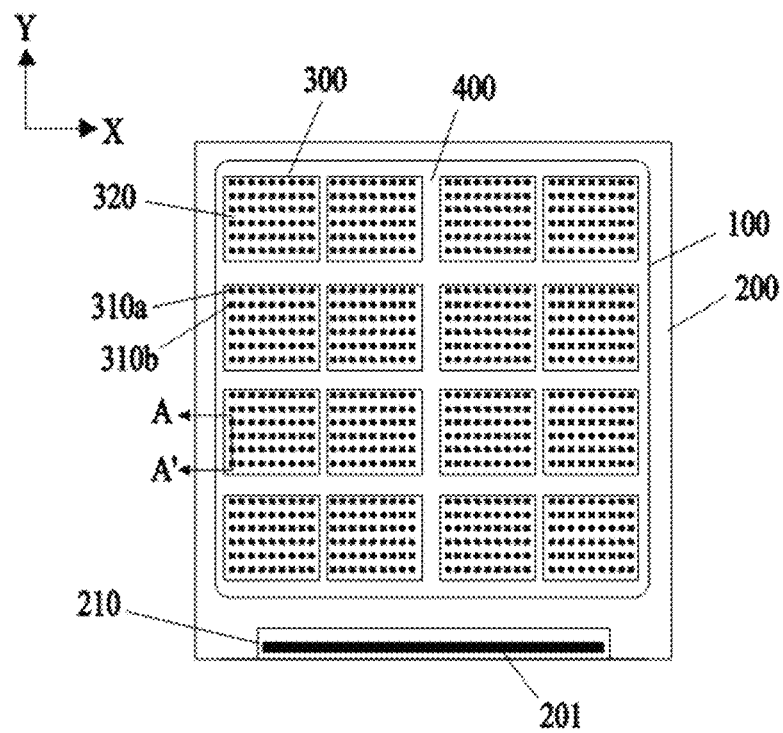
FIG. 1 is a first schematic diagram of a planar structure of a display panel according to an exemplary embodiment of the present disclosure.

To make objectives, technical solutions, and advantages of the present disclosure more clear, the embodiments of the present disclosure will be described in detail with reference to the accompanying drawings. It is to be noted that implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the drawings, a size of each constituent element, a thickness of a layer, or a region is exaggerated sometimes for clarity. Therefore, one implementation of the present disclosure is not necessarily limited to the dimensions, and shapes and sizes of various components in the drawings do not reflect actual scales. In addition, the drawings schematically illustrate ideal examples, and one implementation of the present disclosure is not limited to the shapes, numerical values, or the like shown in the drawings.

Ordinal numerals such as "first", "second", and "third" in the specification are set to avoid confusion of constituent elements, but not set to make a limit in quantity.

In the specification, for convenience, wordings indicating orientation or positional relationships, such as "middle", "upper", "lower", "front", "back", "vertical", "horizontal", "top", "bottom", "inside", and "outside", used for illustrating positional relationships between constituent elements with reference to the drawings, cannot be considered as limitations on the present disclosure, which are merely for facilitating the description of the specification and simplifying the description, rather than indicating or implying that a referred apparatus or element must have a particular orientation and be constructed and operated in the particular orientation. The positional relationships between the constituent elements are changed as appropriate according to directions for describing various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection, or an integrated connection; it may be a mechanical connection or an electrical connection; it may be a direct mutual connection, or an indirect connection through middleware, or internal communication between two elements. Those of ordinary skills in the art may understand specific meanings of these terms in the present disclosure according to specific situations.

In the specification, a transistor refers to an element which at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, a first electrode may be a source electrode, and a second electrode may be a drain electrode. In the case that transistors with opposite polarities are used or the case that a current direction is changed during circuit operation, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switching elements (such as transistors), resistors, inductors, capacitors, other elements with various functions, etc.

In the specification, "parallel" refers to a state in which an angle formed by two straight lines is $-10°$ or more than $-10°$ and $10°$ or less than $10°$, and thus also includes a state in which the angle is $-5°$ or more than $-5°$ and $5°$ or less than $5°$. In addition, "perpendicular" refers to a state in which an angle formed by two straight lines is $80°$ or more than $80°$ and $100°$ or less than $100°$, and thus also includes a state in which the angle is $85°$ or more than $85°$ and $95°$ or less than $95°$.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

FIG. 1 is a first schematic diagram of a planar structure of a display panel according to an exemplary embodiment of the present disclosure. In an exemplary embodiment, as shown in FIG. 1, the display panel of the embodiment of the present disclosure may include a display region 100 for displaying images, and a bonding region 210 and a peripheral region 200 that are disposed outside the display region 100.

In an exemplary embodiment, the display panel of the exemplary embodiment of the present disclosure may include at least one of a Twisted Nematic (TN) liquid crystal display panel, an In Plane Switching (IPS) liquid crystal display panel, a Fringe Field Switching (FFS) liquid crystal display panel, and an Advanced Super Dimension Switch (ADS) liquid crystal display panel. For example, the display panel of the exemplary embodiment of the present disclosure may be a Twisted Nematic (TN) liquid crystal display panel.

In the exemplary embodiment, the display panel in the exemplary embodiment of the present disclosure may be a Passive Matrix (PM) liquid crystal display panel. In the PM liquid crystal display panel, a matrix of display units is formed by the first pixel electrode, the second pixel electrode, and the common electrode. The display units in the array are illuminated by scanning, with each display unit operated in a short-pulse mode to achieve instantaneous high-brightness illumination. This structure is simple and can effectively reduce manufacturing costs.

Taking the Passive Matrix (PM) liquid crystal display panel as an example, the structure of the display panel in the exemplary embodiment of the present disclosure will be explained below.

In an exemplary embodiment, as shown in FIG. 1, the display region 100 may include multiple display units 300 arranged in an array, and the multiple display units 300 arranged in the array are in a rectangular shape. At least one display unit 300 may include at least one first pixel region 310a, at least one second pixel region 310b, and a light transmitting region 320. The first pixel region 310a is configured to perform image display on a first side of the display panel, and the second pixel region 310b is configured to perform image display on a second side of the display panel, so that the display panel achieves double-sided display. The light transmitting region 320 is located outside the first pixel region 310a and the second pixel region 310b, and is configured to transmit light, so that the display unit 300 can achieve image display in a transparent state, that is, transparent display.

In an exemplary embodiment, as shown in FIG. 1, the display region 100 may also include a surrounding region 400 located outside the display units 300 which separates adjacent display units 300 apart. The surrounding region 400 can be transmitted by light, so that the display unit 300 can achieve image display in a transparent state.

In an exemplary embodiment, as shown in FIG. 1, the display units 300 may be rectangular, multiple display units 300 may be disposed along a first direction (e.g., direction X) to form display unit rows. A distance between edges of adjacent display units 300 in one display unit row may be 1 mm to 10 mm, and, for example, a distance between edges of adjacent display units 300 may be 1 mm to 2 mm.

In an exemplary embodiment, as shown in FIG. 1, the display region 100 may also include a surrounding region 400 located outside the display units 300 which separates adjacent display units 300 apart. The surrounding region 400 can be transmitted by light, so that the display unit 300 can achieve image display in a transparent state.

In an exemplary embodiment, as shown in FIG. 1, the display units 300 may be rectangular, multiple display units 300 may be disposed along a second direction (e.g. direction Y) to form display unit columns. A distance between edges of adjacent display units 300 in one display unit column may be 1 mm to 10 mm, and, for example, a distance between edges of adjacent display units 300 may be 1 mm to 2 mm.

In an exemplary embodiment, as shown in FIG. 1, at least one first pixel region 310a and at least one second pixel region 310b may be alternately disposed along a second direction (e.g. direction Y), thereby forming a pixel region column. Multiple pixel region columns may be disposed along a first direction (e.g. direction X). The orthographic projections of the first pixel region 310a and the second pixel region 310b on the plane where the display panel is located do not overlap. The first pixel region 310a is configured to perform image display on the first side of the display panel. The second pixel region 310b is configured to perform image display on the second side of the display panel. Therefore, the display panel can achieve double-sided image display in a transparent state, and can achieve transparent display of different images on both sides of the display panel. The first direction intersects with the second direction, for example, the first direction is perpendicular to the second direction.

In an exemplary embodiment, as shown in FIG. 1, a sum of areas of the first pixel region 310a and the second pixel region 310b in the display unit 300 may be greater than, or smaller than, or equal to the area of the transparent region 320, which is not limited in the present disclosure. Generally, the larger the area of the light transmitting region 320 is, the greater the transmittance rate of the display unit 300 is, and the greater the transmittance rate of the display panel is, the clearer the image viewed through the display panel is.

In an exemplary embodiment, as shown in FIG. 1, the bonding region 210 may be located on one side of the display region 100 in a second direction (e.g., direction Y), and the bonding region 210 may include at least a bonding sub-region 201, which may extend along a first direction (e.g., direction X). The bonding sub-region 201 may include at least one bonding terminal, which is configured to be bonded to the flexible circuit board and connected to the external circuit through the flexible circuit board.

Figure 2A:
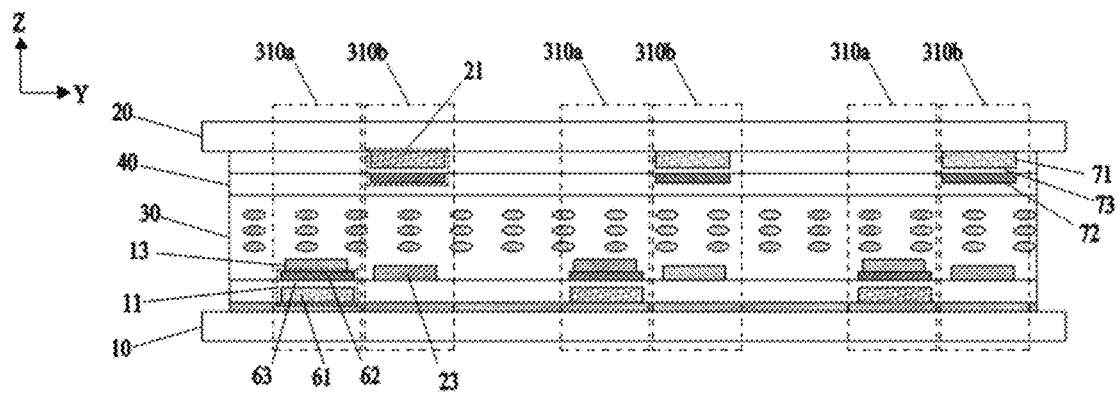
FIG. 2A is a first cross-sectional view of a display panel according to an exemplary embodiment of the present disclosure.

FIG. 2A is a first cross-sectional view of a display panel according to an exemplary embodiment of the present disclosure. FIG. 2A may be a cross-sectional view of A-A' in FIG. 1. In an exemplary embodiment, as shown in FIG. 2A, the first pixel region 310a of the display unit may include a first base 10, a second base 20 disposed oppositely, and a light adjusting film layer 30 disposed between the first base 10 and the second base 20. The first pixel region 310a may further include a first light shield pattern 11 disposed on a side of the first base 10 close to the light adjusting film layer 30, and a first pixel electrode 13 disposed on a side of the first light shield pattern 11 close to the light adjusting film layer 30, and a common electrode 40 disposed on a side of the second base 20 close to the light adjusting film layer 30.

In an exemplary embodiment, as shown in FIG. 2A, there is an overlapping region between an orthographic projection of the first pixel electrode 13 and an orthographic projection of the common electrode 40 on the first base 10, for example, an orthographic projection of the first pixel electrode 13 on the first base 10 is within an orthographic projection of the common electrode 40 on the first base 10. The first pixel electrode 13 and the common electrode 40 can control the light adjusting film layer 30 between them, so that the display light can be transmitted from the direction of the second base 20 by passing through the light adjusting film layer 30, and the display image on the second base 20 side in the display panel can be controlled.

In an exemplary embodiment, as shown in FIG. 2A, the first pixel electrode 13 and the common electrode 40 may be provided on two sides of the light adjusting film layer 30, and by applying a first voltage across the first pixel electrode 13 and the common electrode 40, a display image on the second base 20 side may be controlled.

In an exemplary embodiment, as shown in FIG. 2A, an orthographic projection of the first pixel electrode 13 overlaps with an orthographic projection of the first light shield pattern 11 on the first base 10. The first light shield pattern 11 is configured to shield the display light of the first pixel region 310a to prevent the display light of the first pixel region 310a from being emitted from the first base 10 side of the display panel.

In an exemplary embodiment, as shown in FIG. 2A, the second pixel region 310b of the display unit may include a first base 10, a second base 20 disposed oppositely, and a light adjusting film layer 30 disposed between the first base 10 and the second base 20. The second pixel region 310*b* may further include a second pixel electrode 23 disposed on a side of the first base 10 close to the light adjusting film layer 30, a second light shield pattern 21 disposed on a side of the second base 20 close to the light adjusting film layer 30, and a common electrode 40 disposed on a side of the second light shield pattern 21 close to the light adjusting film layer 30.

In an exemplary embodiment, as shown in FIG. 2A, there is an overlapping region between an orthographic projection of the second pixel electrode 23 and an orthographic projection of the common electrode 40 on the first base 10, for example, an orthographic projection of the second pixel electrode 23 on the first base 10 is within an orthographic projection of the common electrode 40 on the first base 10. The second pixel electrode 23 and the common electrode 40 can control the light adjusting film layer 30 between them, so that the display light can be transmitted from the direction of the first base 10 by passing through the light adjusting film layer 30, and the display image on the first base 10 side of the display panel can be controlled.

In an exemplary embodiment, as shown in FIG. 2A, the second pixel electrode 23 and the common electrode 40 may be provided on two sides of the light adjusting film layer 30, and by applying a second voltage across the second pixel electrode 23 and the common electrode 40, a display image on the first base 10 side may be controlled.

In an exemplary embodiment, as shown in FIG. 2A, an orthographic projection of the second pixel electrode 23 overlaps with an orthographic projection of the second light shield pattern 21 on the first base 10. The second light shield pattern 21 is configured to shield the display light of the second pixel region 310*b* to prevent the display light of the second pixel region 310*b* from being emitted from the second base 20 side of the display panel.

In an exemplary embodiment, as shown in FIG. 2A, there is no overlapping region between an orthographic projection of the second pixel electrode 23 and an orthographic projection of the first pixel electrode 13 on the first base 10, thereby preventing light rays of the first pixel region 310*a* and the second pixel region 310*b* from interfering with each other.

In an exemplary embodiment, as shown in FIG. 2A, the light transmitting region of the display unit is a region other than the first pixel region 310*a* and the second pixel region 310*b* in the display unit. The light transmitting region includes a first base 10, a second base 20 disposed oppositely, a light adjusting film layer 30 disposed between the first base 10 and the second base 20, and a common electrode 40 disposed on a side of the second base 20 close to the light adjusting film layer 30. The first pixel electrode 13, the second pixel electrode 23, the first light shield pattern 11, and the second light shield pattern 21 are not provided in the light transmitting region to avoid affecting the light transmittance of the light transmitting region.

Figure 3:
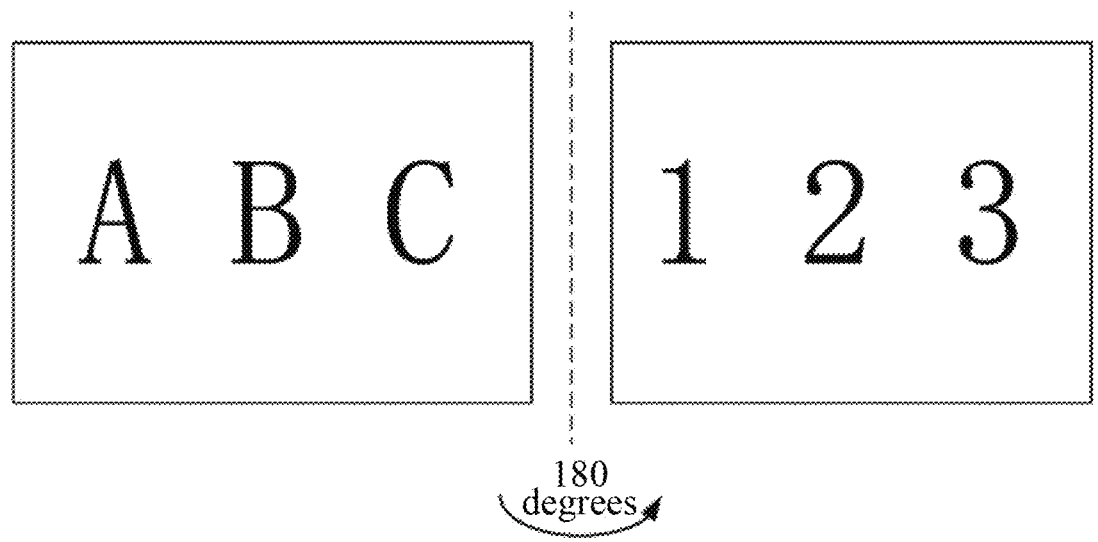
FIG. 3 is a display effect of a display panel according to an exemplary embodiment of the present disclosure.

FIG. 3 is a display effect of a display panel according to an exemplary embodiment of the present disclosure. In an exemplary embodiment, the display panel of the embodiment of the present disclosure can enable the first pixel region and the second pixel region of the display panel to display different contents by applying a first voltage across the first pixel electrode 13 and the common electrode 40 and applying a second voltage across the second pixel electrode 23 and the common electrode 40, thereby presenting a display effect as shown in FIG. 3.

In an exemplary embodiment, as shown in FIG. 3, the content displayed by the second pixel region 310*b* on the first base 10 side of the display panel is "ABC", the content displayed by the first pixel region 310*a* on the second base 20 side of the display panel is "123", and different contents may be displayed on both sides of the display panel.

In an exemplary embodiment, the light transmitting region 320 in the display panel of the embodiment of the present disclosure is configured to transmit light, so that the display unit 300 can achieve image display in a transparent state, i.e. transparent display. The display panel of the embodiment of the present disclosure can not only display different contents on both sides, but also achieve transparent display on both sides to provide rich display effects. For example, as shown in FIG. 3, in addition to displaying different contents on the first base 10 side and the second base 20 side, the display panel may also form a light transmitting region in regions other than the display contents "ABC" and "123". In the process of display, the light transmitting region can achieve the transparent effect, so that the user can view the scene behind the display panel through the display panel.

In an exemplary embodiment, as shown in FIG. 2A, the light adjusting film layer 30 in the display panel of the embodiment of the present disclosure includes a liquid crystal. The liquid crystal material may be polymer dispersed liquid crystal (PDLC), polymer stabilized liquid crystal (PSLC) or electrochromic material. The light adjusting film layer 30 may be disposed between the first pixel electrode 13 and the common electrode 40 and between the second pixel electrode 23 and the common electrode 40, controlled by a first voltage applied across the first pixel electrode 13 and the common electrode 40 and a second voltage applied across the second pixel electrode 23 and the common electrode 40, thereby achieving double-sided display of the display panel.

In an exemplary embodiment, the material of the liquid crystal may be polymer stabilized liquid crystal (PSLC). Polymer stabilized liquid crystal (PSLC) has the advantages of high transparency, fast response and color display, and the like. When the material of the light adjusting film layer 30 is PSLC, the light adjusting film layer 30 can perform a light guiding function while displaying, so that the transparency is high. When the display panel needs to display an image, a voltage is applied across the first pixel electrode 13 and the common electrode 40, and/or between the second pixel electrode 23 and the common electrode 40, so that the liquid crystal deflects in the cell and scatters light to achieve the display function. When the display panel does not need to display an image, no voltage is applied across the first pixel electrode 13 and the common electrode 40, and across the second pixel electrode 23 and the common electrode 40, so that the display panel is in a transparent state.

Figure 4A:
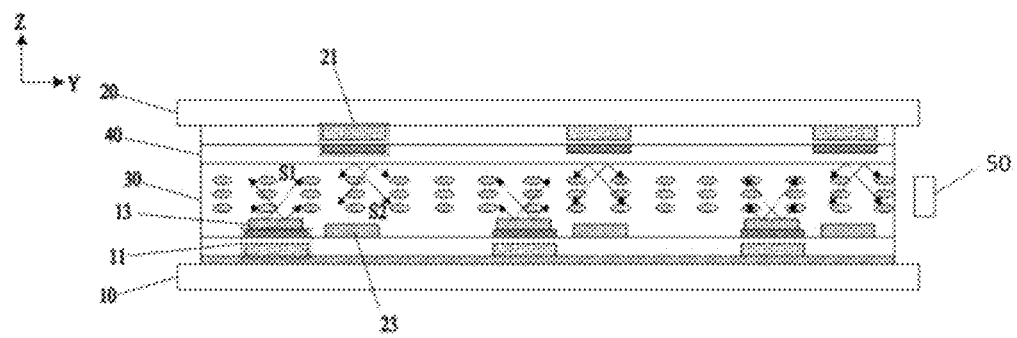
FIG. 4A is a first schematic diagram of a light path in a display panel according to an exemplary embodiment of the present disclosure.

FIG. 4A is a first schematic diagram of a light path in a display panel according to an exemplary embodiment of the present disclosure. In an exemplary embodiment, as shown in FIG. 4A, the display panel of the embodiment of the present disclosure further includes a light source 50 located at a side of the light adjusting film layer 30 to enable the display panel to achieve a side-entrance type light entry mode.

When the display panel needs to display, a first voltage may be applied across the first pixel electrode 13 and the common electrode 40 on two sides of the light adjusting film layer 30 to deflect the liquid crystal in the light adjusting film layer 30, so that the light emitted from the light source 50 is scattered in the light adjusting film layer 30 between the first pixel electrode 13 and the common electrode 40, and is emitted from the second base 20 side in the first light exit path S1, to achieve the display of an image on the second base 20 side of the display panel. The first light shield pattern 11 may shield light rays, thereby preventing light rays emitted in the first light exit path S1 from being emitted from the first base 10 side. A second voltage may be applied across the second pixel electrode 23 and the common electrode 40 to deflect the liquid crystal in the light adjusting film layer 30, so that the light emitted from the light source 50 is scattered in the light adjusting film layer 30 between the second pixel electrode 23 and the common electrode 40, and emitted from the first base 10 side in the second light exit path S2, to achieve the display of an image on the first base 10 side of the display panel. The second light shield pattern 21 may shield light rays, thereby preventing light rays emitted in the second light exit path S2 from being emitted from the second base 20 side.

The display panel of the embodiment of the present disclosure can achieve double-sided transparent display, and the two sides of the display panel can also display different pictures and different colors. The first light shield pattern 11 and the second light shield pattern 21 are used in the display panel according to the embodiment of the present disclosure, so that the images displayed on both sides of the display panel do not interfere with each other.

Figure 4B:
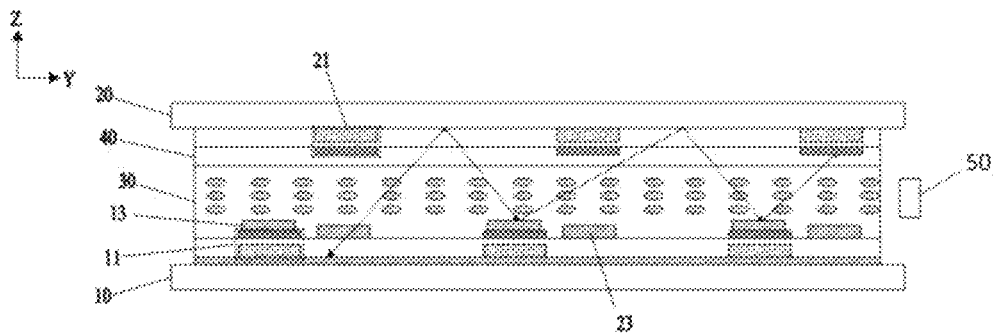
FIG. 4B is a second schematic diagram of a light path in a display panel according to an exemplary embodiment of the present disclosure.

FIG. 4B is a second schematic diagram of a light path in a display panel according to an exemplary embodiment of the present disclosure. In the exemplary embodiment, as shown in FIG. 4B, when the display panel does not need to display, no voltage is applied across the first pixel electrode 13 and the common electrode 40 on two sides of the light adjusting film layer 30, or across the second pixel electrode 23 and the common electrode 40, so that the liquid crystal in the light adjusting film layer 30 does not deflect, and the light emitted from the light source 50 does not emit from the first base 10 side and the second base 20 side of the display panel.

In a first pixel region in a display panel according to an exemplary embodiment of the present disclosure, an image is displayed on the second base 20 side of the display panel, a first light shield pattern 11 shields light rays of the first pixel region, which prevents light rays of the first pixel region from being emitted on the first base 10 side of the display panel. In a second pixel region in a display panel according to an exemplary embodiment of the present disclosure, an image is displayed on the first base 10 side of the display panel, the second light shield pattern 21 shields light rays of the second pixel region, which prevents light rays of the second pixel region from being emitted on the second base 20 side of the display panel. Therefore, double-sided transparent display is achieved, and images displayed on both sides of the display panel do not interfere with each other.

In an exemplary embodiment, as shown in FIG. 1, an area of the first pixel region 310a may account for 10% to 30% of an area of the display unit 300, so that the second base 20 side of the display panel can display and the displayed image has better brightness and transmittance. An area of the second pixel region 310b may account for 10% to 30% of the area of the display unit 300, so that the first base 10 side of the display panel can display and the displayed image has better brightness and transmittance.

In an exemplary embodiment, the first pixel region and the second pixel region in the display panel of the exemplary embodiment of the present disclosure may adopt various shapes, for example, the first pixel region and the second pixel region may both adopt regular or irregular shapes such as rectangle, circle, ellipse, diamond, polygon, etc.

Figure 5:
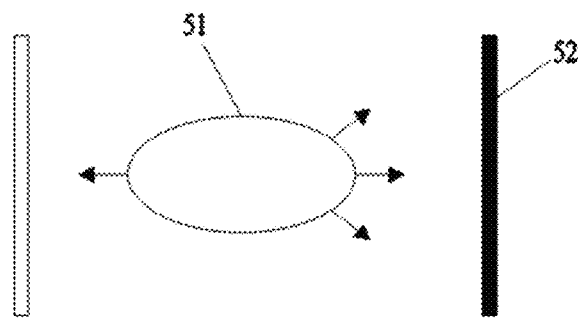
FIG. 5 is a schematic diagram of light scattering by a light adjusting film layer in a related display panel.

FIG. 5 is a schematic diagram of light scattering by a light adjusting film layer in a related display panel. The research of the inventor of the present application finds that as shown in FIG. 5, the liquid crystal material of the light adjusting film layer in the related display panel may adopt the polymer stabilized liquid crystal 51 (PSLC), and the display of the related display panel achieves scattering through the polymer stabilized liquid crystal 51 (PSLC). In order to control light and avoid light leakage, most of the related display panels use light shield layer 52 to shield light, and the material of light shield layer 52 generally uses a black absorbing material such as black matrix (BM) and black photo spacer (bps). The light shield layer 52 absorbs light, which reduces the display brightness and contrast of the display panel. Because of the material system of polymer stabilized liquid crystal 51 (PSLC), when the display panel is in a bright state, the brightness is mainly provided by the scattering of light by polymer and liquid crystal, which is Mie scattering, that is, the scattering is stronger in the forward direction than in the backward direction, and the directivity is obvious. Most of the light is absorbed by the BM, and only a small part of the light is used for display. Therefore, the display brightness and contrast of the related display panel are low.

In an exemplary embodiment, as shown in FIG. 2A, the first light shield pattern 11 includes a first light shield material layer 61 and a first reflective layer 62. The first reflective layer 62 is located on a side of the first light shield material layer 61 close to the light adjusting film layer 30, and configured to emit incident light rays towards a direction of the light adjusting film layer 30. The first light shield material layer 61 is configured to shield ambient light reflected by the first reflective layer 62.

In an exemplary embodiment, as shown in FIG. 2A, the first light shield pattern 11 further includes a first dielectric material layer 63 disposed between the first light shield material layer 61 and the first reflective layer 62 to isolate the first light shield material layer 61 from the first reflective layer 62. The material of the first dielectric material layer 63 may be an optical adhesive.

In an exemplary embodiment, as shown in FIG. 2A, the first dielectric material layer 63 is a continuous film layer, the first dielectric material layer 63 covers the entire first base 10, and multiple first light shield patterns 11 may share one first dielectric material layer 63.

In an exemplary embodiment, the material of the first light shield material layer 61 may be a black absorbing material such as a black matrix (BM), a black photo spacer (bps) or the like.

The display panel of the exemplary embodiment of the present disclosure shields the ambient light reflected by the first reflective layer 62 by using the first light shield material layer 61 to prevent the ambient light reflected by the first reflective layer 62 from interfering with the display of the second pixel region.

In an exemplary embodiment, the material of the first reflective layer 62 may be a metal or an alloy, for example, the material of the first reflective layer 62 may be a strongly reflective metal material such as molybdenum (Mo), copper (Cu), silver (Ag), aluminum (Al) or an alloy of any of the above-mentioned metal materials.

Figure 11:
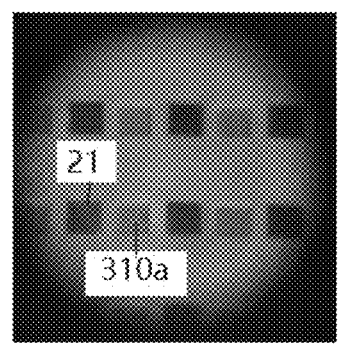
FIG. 11 is an effect view of a display panel under a microscope according to an exemplary embodiment of the present disclosure.

FIG. 11 is an effect view of a display panel according to an exemplary embodiment of the present disclosure under a microscope. The display panel of the exemplary embodiment of the present disclosure reflects the light emitted from the light adjusting film layer 30 towards the direction of the first base 10 into the light adjusting film layer 30 through the first reflective layer 62, so that the reflected light is scattered again in the light adjusting film layer 30 and emitted from the second base 20 side, thereby improving the display brightness and contrast of the first pixel region, for example, the contrast is improved by 13% and the brightness is improved by over 25%, as shown in FIG. 11.

In an exemplary embodiment, as shown in FIG. 2A, the surface of the first reflective layer 62 on a side close to the light adjusting film layer 30 is planar, so that the first reflective layer 62 has a light reflection function.

Figure 2B:
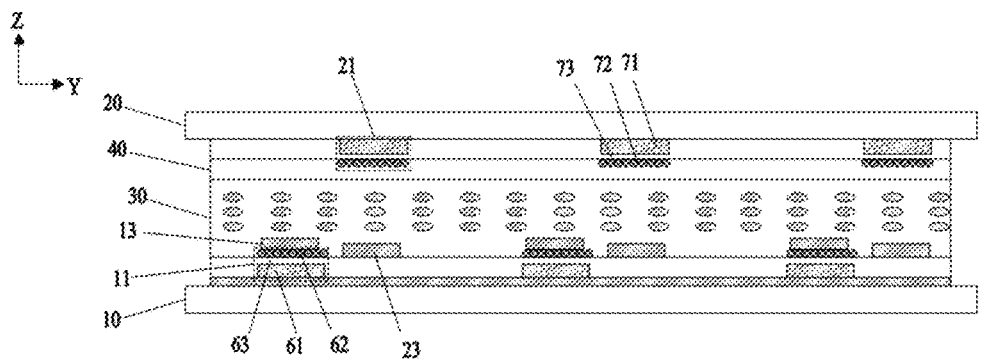
FIG. 2B is a second cross-sectional view of a display panel according to an exemplary embodiment of the present disclosure.

FIG. 2B is a second cross-sectional view of a display panel according to an exemplary embodiment of the present disclosure. FIG. 2B may be a sectional view taken along A-A' in FIG. 1. In the exemplary embodiment, as shown in FIG. 2B, the surface of the first reflective layer 62 close to the light adjusting film layer 30 is a concave-convex surface, and the concave-convex surface can reduce specular scattering of the first reflective layer 62 and cause random scattering of the first reflective layer 62, thereby improving light exit brightness and display brightness.

In an exemplary embodiment, as shown in FIG. 2B, the first reflective layer 62 includes multiple metal particles which form a concave-convex surface on a side of the first reflective layer 62 close to the light adjusting film layer 30. Herein, the shapes of metal particles include but are not limited to sphere, cylinder, prism, pyramid and the like.

In an exemplary embodiment, as shown in FIG. 2A, the second light shield pattern 21 includes a second light shield material layer 71 disposed on the second base 20 and a second reflective layer 72 disposed on a side of the second light shield material layer 71 close to the light adjusting film layer 30. The second reflective layer 72 is configured to emit incident light rays towards the direction of the light adjusting film layer 30. The second light shield material layer 71 is configured to shield the ambient light reflected by the second reflective layer 72.

In an exemplary embodiment, as shown in FIG. 2A, the second light shield pattern 21 further includes a second dielectric material layer 73 disposed between the second light shield material layer 71 and the second reflective layer 72 to isolate the second light shield material layer 71 from the second reflective layer 72. The material of the second dielectric material layer 73 may be an optical adhesive.

In an exemplary embodiment, as shown in FIG. 2A, the second dielectric material layer 73 is a continuous film layer, the second dielectric material layer 73 covers the entire first base 10, and multiple second light shield patterns 21 share one second dielectric material layer 73.

In an exemplary embodiment, the material of the second light shield material layer 71 may be a black absorbing material such as a black matrix (BM), a black photo spacer (bps) or the like.

The display panel of the exemplary embodiment of the present disclosure shields the ambient light reflected by the second reflective layer 72 by using the second light shield material layer 71 to prevent the ambient light reflected by the second reflective layer 72 from interfering with the display of the first pixel region.

In an exemplary embodiment, the material of the second reflective layer 72 may be a metal or an alloy, for example, the material of the second reflective layer 72 may be a strongly reflective metal material such as molybdenum (Mo), copper (Cu), silver (Ag), aluminum (Al), etc., or an alloy of any of the above-mentioned metal materials.

The display panel of the exemplary embodiment of the present disclosure reflects the light emitted from the light adjusting film layer 30 towards the direction of the second base 20 into the light adjusting film layer 30 through the second reflection layer 72, so that the reflected light is scattered again in the light adjusting film layer 30 and emitted from the first base 10 side, thereby improving the brightness and contrast of the display image in the second pixel region.

Figure 6:
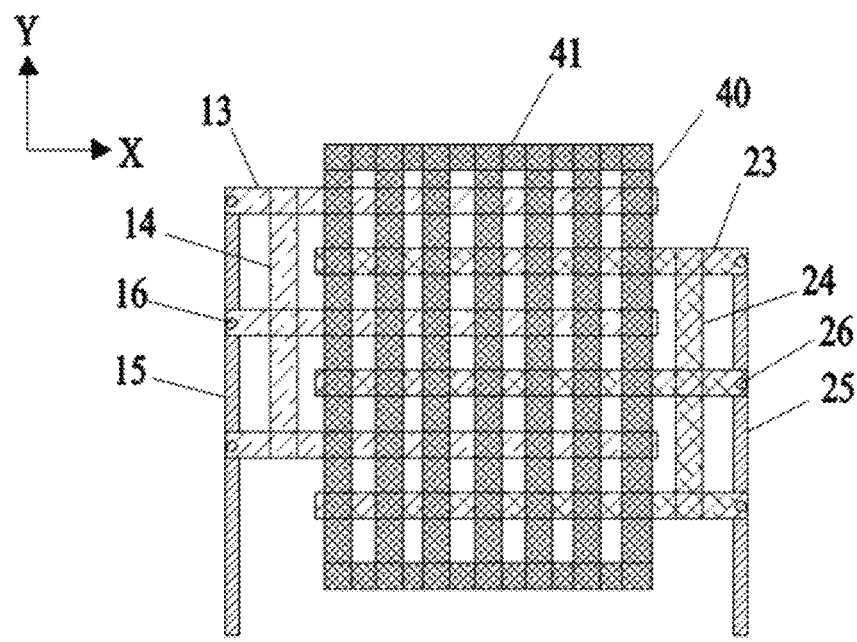
FIG. 6 is a schematic diagram of a structure of a first pixel electrode, a second pixel electrode, and a common electrode in a display unit in a display panel according to an exemplary embodiment of the present disclosure.

FIG. 6 is a schematic diagram of a structure of a first pixel electrode, a second pixel electrode, and a common electrode in a display unit in a display panel according to an exemplary embodiment of the present disclosure. In an exemplary embodiment, as shown in FIG. 6, one display unit 300 includes multiple first pixel electrodes 13, multiple second pixel electrodes 23, and multiple common electrodes 40, all of which are in a line shape. The multiple first pixel electrodes 13 each extend along a first direction (e.g. direction X), and the multiple first pixel electrodes 13 are disposed at intervals along a second direction (e.g. direction Y). The multiple second pixel electrodes 23 each extend along a first direction (e.g. direction X), the multiple second pixel electrodes 23 are disposed at intervals along the second direction (e.g. direction Y), and the multiple first pixel electrodes 13 and the multiple second pixel electrodes 23 are alternately disposed along the second direction (e.g. direction Y) to form an interdigital structure. This arrangement of the first pixel electrodes 13 and the second pixel electrodes 23 can not only achieve individual driving of the electrodes, but also avoid generating an optical moire phenomenon and improve the resolution of the display. Herein, a line width of the first pixel electrode 13 may be about 50 microns to 150 microns, a line width of the second pixel electrode 23 may be about 50 microns to 150 microns, and a line width of the common electrode 40 may be about 50 microns to 150 microns.

In an exemplary embodiment, as shown in FIG. 6, multiple common electrodes 40 each extend in a second direction (e.g. direction Y), multiple common electrodes 40 are disposed at intervals along a first direction (e.g. direction X), and an orthographic projection of each common electrode 40 overlaps with each of orthographic projections of all first pixel electrodes 13 and all second pixel electrodes 23 on the first base, and the overlapping region between an orthographic projection of a common electrode 40 and an orthographic projection of one first pixel electrode 13 on the first base is a first pixel region; and an overlapping region between an orthographic projection of a common electrode 40 and an orthographic projection of a second pixel electrode 23 on the first base is a second pixel region.

It should be noted that the first pixel electrode 13, the second pixel electrode 23, and the common electrode 40 may adopt other shapes. For example, the shapes of the first pixel electrode 13 and the second pixel electrode 23 may also be other regular or irregular shapes such as a diamond ellipse or polygon.

In an exemplary embodiment, the multiple first pixel electrodes 13 and the multiple second pixel electrodes 23 may be located in the same film layer, and use the same or different materials. In some embodiments, the multiple first pixel electrodes 13 and the multiple second pixel electrodes 23 may be located in different film layers, and use the same or different materials.

Figure 7A:
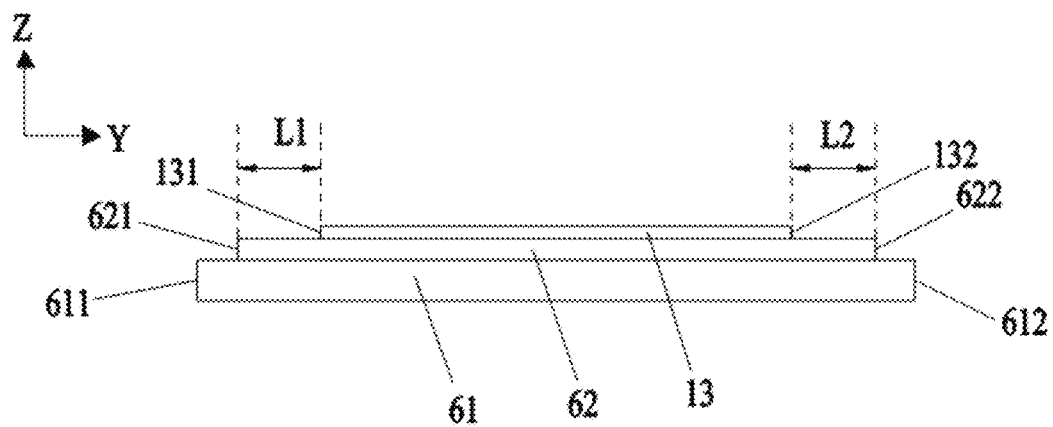
FIG. 7A is a first schematic diagram of a structure of a first light shield pattern in a display panel according to an exemplary embodiment of the present disclosure.

FIG. 7A is a first schematic diagram of a structure of a first light shield pattern in a display panel according to an exemplary embodiment of the present disclosure. In an exemplary embodiment, as shown in FIGS. 2a and 7a, the first light shield pattern 11 may extend in a first direction (for example, direction X), and the extension direction of the first light shield pattern 11 may be the same as that of the first pixel electrode 13. Multiple first light shield patterns 11 are disposed at intervals along a second direction (for example, direction Y). An orthographic projection of the first light shield pattern 11 on the first base 10 overlaps with an orthographic projection of the first pixel electrode 13 on the first base 10.

In some embodiments, the extension direction of the first light shield pattern may also be different from the extension direction of the first pixel electrode as long as there is an overlapping region between an orthographic projection of the first light shield pattern and an orthographic projection of the first pixel electrode on the first base.

In an exemplary embodiment, as shown in FIG. 7A, an orthographic projection of the first reflective layer 62 on the first base 10 is located within an orthographic projection of the first light shield material layer 61 on the first base 10, and an area of the orthographic projection of the first reflective layer 62 on the first base 10 is smaller than an area of the orthographic projection of the first light shield material layer 61 on the first base 10.

In an exemplary embodiment, as shown in FIG. 7A, the first reflective layer 62 may extend in a first direction (e.g. direction X), and the first reflective layer 62 has a first edge 621 and a second edge 622 oppositely disposed in a second direction (e.g. direction Y). The first pixel electrode 13 may extend in a first direction (e.g., direction X), and the first pixel electrode 13 has a third edge 131 and a fourth edge 132 disposed oppositely in a second direction (e.g., direction Y). The first light shield material layer 61 may extend along the first direction (e.g. direction X), and the first light shield material layer 61 has a fifth edge 611 and a sixth edge 612 disposed oppositely in the second direction (e.g. direction Y). The first edge 621, the third edge 131, and the fifth edge 611 are provided on a same side, and the second edge 622, the fourth edge 132, and the sixth edge 612 are provided on a same side.

In an exemplary embodiment, as shown in FIG. 7A, the first edge 621 protrudes from the third edge 131 in the second direction (e.g. direction Y), and the first edge 621 is located on a side of the third edge 131 away from the fourth edge 132. A first distance L1 is formed between the first edge 621 and the third edge 131, which may be greater than or equal to 5 microns, for example, the first distance L1 may be about 5 microns to 50 microns, and for example, the first distance L1 may be about 5 microns to 10 microns.

The display panel of the exemplary embodiment of the present disclosure ensures that the first reflective layer 62 can completely shield the third edge 131 of the first pixel electrode 13 by forming a first distance L1 between the first edge 621 and the third edge 131, thus avoiding affecting the display effect due to the error in the preparation process causing that the first reflective layer 62 does not completely shield the third edge 131 of the first pixel electrode 13.

In an exemplary embodiment, as shown in FIG. 7A, the fifth edge 611 protrudes from the first edge 621 in a second direction (e.g., direction Y), and the fifth edge 611 is located on a side of the first edge 621 away from the fourth edge 132, so as to ensure that the first light shield material layer 61 can completely shield the first edge 621 of the first reflective layer 62, thereby avoiding affecting the display effect due to the error in the preparation process causing that the first light shield material layer 61 does not completely shield the first edge 621 of the first reflective layer 62.

In an exemplary embodiment, as shown in FIG. 7A, the second edge 622 protrudes from the fourth edge 132 in a second direction (e.g. direction Y), and the second edge 622 is located on a side of the fourth edge 132 away from the third edge 131. A second distance L2 is formed between the second edge 622 and the fourth edge 132, which may be greater than or equal to 5 microns, for example, the second distance L2 may be about 5 microns to 50 microns, and for example, the second distance L2 may be about 5 microns to 10 microns.

The display panel of the exemplary embodiment of the present disclosure ensures that the first reflective layer 62 can completely shield the fourth edge 132 of the first pixel electrode 13 by forming a second distance L2 between the second edge 622 and the fourth edge 132, thus avoiding affecting the display effect due to the error in the preparation process causing that the first reflective layer 62 does not completely shield the fourth edge 132 of the first pixel electrode 13.

In an exemplary embodiment, as shown in FIG. 7A, the sixth edge 612 protrudes from the second edge 622 in a second direction (e.g. direction Y), and the sixth edge 612 is located on a side of the second edge 622 away from the third edge 131, so as to ensure that the first light shield material layer 61 can completely shield the second edge 622 of the first reflective layer 62, thereby avoiding affecting the display effect due to the error in the preparation process causing that the first light shield material layer 61 does not completely shield the second edge 622 of the first reflective layer 62.

Figure 7B:
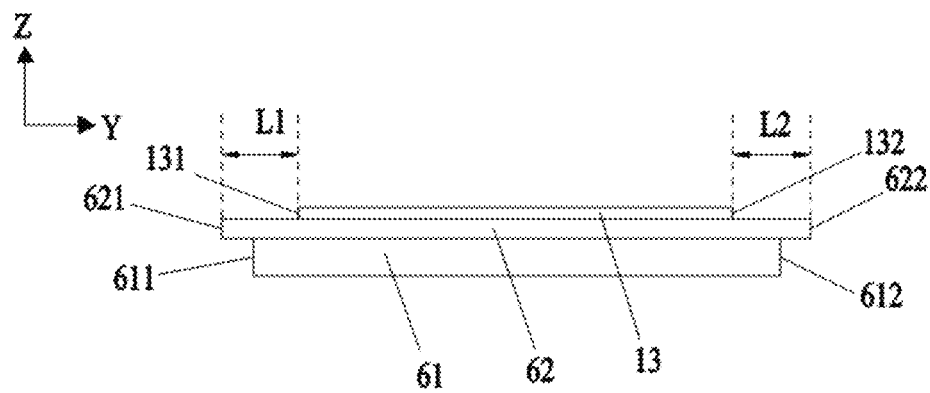
FIG. 7B is a second schematic diagram of a structure of a first light shield pattern in a display panel according to an exemplary embodiment of the present disclosure.

FIG. 7B is a second schematic diagram of a structure of a first light shield pattern in a display panel according to an exemplary embodiment of the present disclosure. In an exemplary embodiment, as shown in FIG. 7B, an orthographic projection of the first light shield material layer 61 on the first base 10 is located within an orthographic projection of the first reflective layer 62 on the first base 10, and an area of the orthographic projection of the first light shield material layer 61 on the first base 10 is smaller than an area of the orthographic projection of the first reflective layer 62 on the first base 10.

In an exemplary embodiment, as shown in FIG. 7B, the first reflective layer 62 in the first light shield pattern 11 has a first edge 621 and a second edge 622 disposed oppositely in a second direction (e.g. direction Y). The first pixel electrode 13 has a third edge 131 and a fourth edge 132 disposed oppositely in a second direction (e.g. direction Y). The first light shield material layer 61 in the first light shield pattern 11 has a fifth edge 611 and a sixth edge 612 disposed oppositely in a second direction (for example, a direction Y). The first edge 621, the third edge 131, and the fifth edge 611 are provided on a same side, and the second edge 622, the fourth edge 132, and the sixth edge 612 are provided on a same side.

In an exemplary embodiment, as shown in FIG. 7B, the first edge 621 protrudes from the third edge 131 in a second direction (e.g. direction Y), and the first edge 621 is located on a side of the third edge 131 away from the fourth edge 132. A first distance L1 is formed between the first edge 621 and the third edge 131, which may be greater than or equal to 5 microns, for example, the first distance L1 may be about 5 microns to 50 microns, and for example, the first distance L1 may be about 5 microns to 10 microns.

The display panel of the exemplary embodiment of the present disclosure ensures that the first reflective layer 62 can completely shield the third edge 131 of the first pixel electrode 13 by forming a first distance L1 between the first edge 621 and the third edge 131, thus avoiding the display effect due to the error of the preparation process causing that the first reflective layer 62 does not completely shield the third edge 131 of the first pixel electrode 13.

In an exemplary embodiment, as shown in FIG. 7B, the first edge 621 protrudes from the fifth edge 611 in a second direction (e.g. direction Y), the first edge 621 is located on a side of the fifth edge 611 away from the fourth edge 132. The fifth edge 611 protrudes from the third edge 131 in a second direction (e.g. direction Y), and the fifth edge 611 is located on a side of the third edge 131 away from the fourth edge 132, so that the first light shield material layer 61 can shield part of the first reflective layer 62.

In an exemplary embodiment, as shown in FIG. 7B, the second edge 622 protrudes from the fourth edge 132 in a second direction (e.g. direction Y), and the second edge 622 is located on a side of the fourth edge 132 away from the third edge 131. A second distance L2 is formed between the second edge 622 and the fourth edge 132, which may be greater than or equal to 5 microns, for example, the second distance L2 may be about 5 microns to 50 microns, and for example, the second distance L2 may be about 5 microns to 10 microns.

The display panel of the exemplary embodiment of the present disclosure ensures that the first reflective layer 62 can completely shield the fourth edge 132 of the first pixel electrode 13 by forming a second distance L2 between the second edge 622 and the fourth edge 132, thus avoiding affecting the display effect due to the error of the preparation process causing that the first reflective layer 62 does not completely shield the fourth edge 132 of the first pixel electrode 13.

In an exemplary embodiment, as shown in FIG. 7B, the second edge 622 protrudes from the sixth edge 612 in a second direction (e.g. direction Y), and the second edge 622 is located on a side of the sixth edge 612 away from the third edge 131. The sixth edge 612 protrudes from the fourth edge 132 in the second direction (e.g. direction Y), and the sixth edge 612 is located on a side of the fourth edge 132 away from the third edge 131, so that the first light shield material layer 61 can shield part of the first reflective layer 62.

Figure 7C:
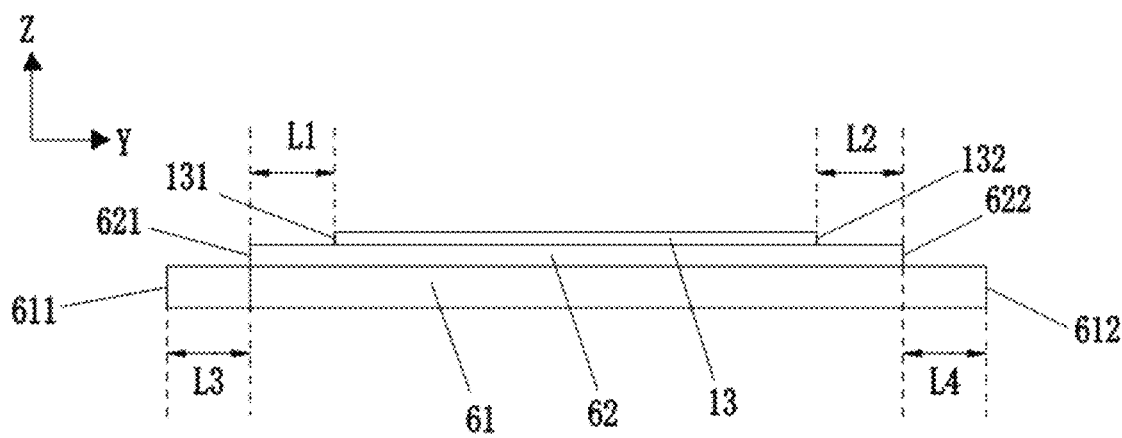
FIG. 7C is a third schematic diagram of a structure of a first light shield pattern in a display panel according to an exemplary embodiment of the present disclosure.

FIG. 7C is a third schematic diagram of a structure of a first light shield pattern in a display panel according to an exemplary embodiment of the present disclosure. In an exemplary embodiment, as shown in FIG. 7C, an orthographic projection of the first reflective layer 62 on the first base 10 is located within an orthographic projection of the first light shield material layer 61 on the first base 10, and an area of the orthographic projection of the first reflective layer 62 on the first base 10 is smaller than an area of the orthographic projection of the first light shield material layer 61 on the first base 10.

In an exemplary embodiment, as shown in FIG. 7C, the first reflective layer 62 in the first light shield pattern 11 has a first edge 621 and a second edge 622 disposed oppositely in a second direction (e.g. direction Y). The first pixel electrode 13 has a third edge 131 and a fourth edge 132 disposed oppositely in the second direction (e.g. the direction Y). The first light shield material layer 61 in the first light shield pattern 11 has a fifth edge 611 and a sixth edge 612 disposed oppositely in the second direction (for example, the direction Y). The first edge 621, the third edge 131, and the fifth edge 611 are provided on a same side, and the second edge 622, the fourth edge 132, and the sixth edge 612 are provided on a same side.

In an exemplary embodiment, as shown in FIG. 7C, the first edge 621 protrudes from the third edge 131 in a second direction (e.g. direction Y), and the first edge 621 is located on a side of the third edge 131 away from the fourth edge 132. A first distance L1 is formed between the first edge 621 and the third edge 131, which may be greater than or equal to 5 microns, for example, the first distance L1 may be about 5 microns to 50 microns, and for example, the first distance L1 may be about 5 microns to 10 microns.

In an exemplary embodiment, as shown in FIG. 7C, the fifth edge 611 protrudes from the first edge 621 in a second direction (e.g. direction Y), and the fifth edge 611 is located on a side of the first edge 621 away from the fourth edge 132. A third distance L3 is formed between the fifth edge 611 and the first edge 621, which may be greater than or equal to 5 microns, for example, the third distance L3 may be about 5 microns to 50 microns, and for example, the third distance L3 may be about 5 microns to 10 microns.

In an exemplary embodiment, as shown in FIG. 7C, the second edge 622 protrudes from the fourth edge 132 in a second direction (e.g. direction Y), and the second edge 622 is located on a side of the fourth edge 132 away from the third edge 131. A second distance L2 is formed between the second edge 622 and the fourth edge 132, which may be greater than or equal to 5 microns, for example, the second distance L2 may be about 5 microns to 50 microns, and for example, the second distance L2 may be about 5 microns to 10 microns.

In an exemplary embodiment, as shown in FIG. 7C, the sixth edge 612 protrudes from the second edge 622 in a second direction (e.g. direction Y), and is located on a side of the second edge 622 away from the third edge 131. A fourth distance L4 is formed between the sixth edge 612 and the second edge 622, which may be greater than or equal to 5 microns, for example, the fourth distance L4 may be about 5 microns to 50 microns, and for example, the third distance L3 may be about 5 microns to 10 microns.

Figure 7D:
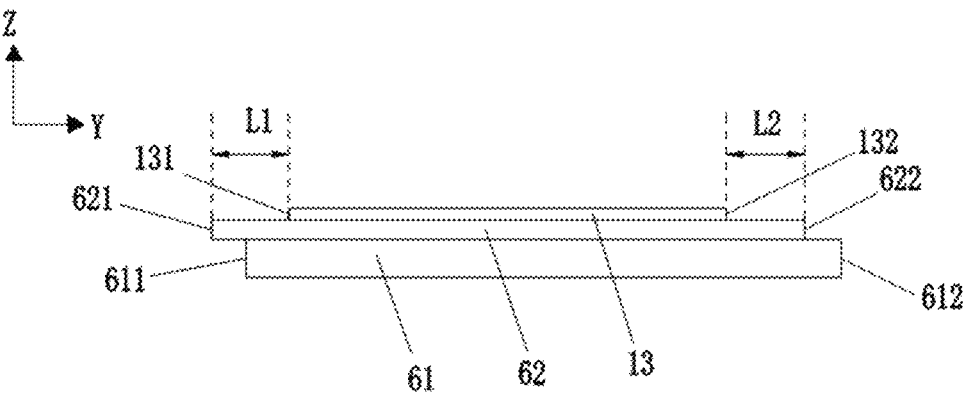
FIG. 7D is a fourth schematic diagram of a structure of a first light shield pattern in a display panel according to an exemplary embodiment of the present disclosure.

FIG. 7D is a fourth schematic diagram of a structure of a first light shield pattern in a display panel according to an exemplary embodiment of the present disclosure. In an exemplary embodiment, as shown in FIG. 7D, there is an overlapping region between an orthographic projection of the first reflective layer 62 and an orthographic projection of the first light shield material layer 61 on the first base 10.

In an exemplary embodiment, as shown in FIG. 7D, the first reflective layer 62 in the first light shield pattern 11 has a first edge 621 and a second edge 622 disposed oppositely in a second direction (e.g. direction Y). The first pixel electrode 13 has a third edge 131 and a fourth edge 132 disposed oppositely in the second direction (e.g. direction Y). The first light shield material layer 61 in the first light shield pattern 11 has a fifth edge 611 and a sixth edge 612 disposed oppositely in the second direction (for example, a direction Y). The first edge 621, the third edge 131, and the fifth edge 611 are provided on a same side, and the second edge 622, the fourth edge 132, and the sixth edge 612 are provided on a same side.

In an exemplary embodiment, as shown in FIG. 7D, the first edge 621 protrudes from the third edge 131 in a second direction (e.g. direction Y), and the first edge 621 is located on a side of the third edge 131 away from the fourth edge 132. A first distance L1 is formed between the first edge 621 and the third edge 131, which may be greater than or equal to 5 microns, for example, the first distance L1 may be about 5 microns to 50 microns, and for example, the first distance L1 may be about 5 microns to 10 microns.

In an exemplary embodiment, as shown in FIG. 7D, the first edge 621 protrudes from the fifth edge 611 in a second direction (e.g. direction Y), and the first edge 621 is located on a side of the fifth edge 611 away from the fourth edge 132.

In an exemplary embodiment, as shown in FIG. 7D, the second edge 622 protrudes from the fourth edge 132 in a second direction (e.g. direction Y), and the second edge 622 is located on a side of the fourth edge 132 away from the third edge 131. A second distance L2 is formed between the second edge 622 and the fourth edge 132, which may be greater than or equal to 5 microns, for example, the second distance L2 may be about 5 microns to 50 microns, and for example, the second distance L2 may be about 5 microns to 10 microns.

In an exemplary embodiment, as shown in FIG. 7D, the sixth edge 612 protrudes from the second edge 622 in a second direction (e.g. direction Y), and is located on a side of the second edge 622 away from the third edge 131.

Figure 7E:
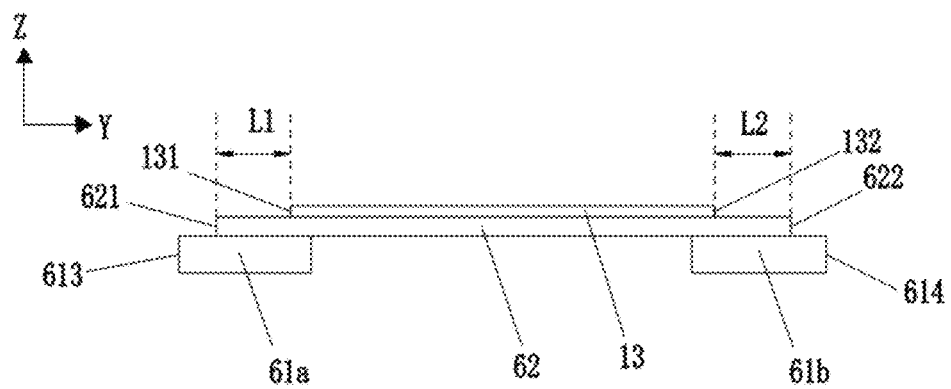
FIG. 7E is a fifth schematic diagram of a structure of a first light shield pattern in a display panel according to an exemplary embodiment of the present disclosure.

FIG. 7E is a fifth schematic diagram of a structure of a first light shield pattern in a display panel according to an exemplary embodiment of the present disclosure. In an exemplary embodiment, as shown in FIG. 7E, the first light shield material layer includes a first sub-light shield material layer 61*a* and a second sub-light shield material layer 61*b*, both extending along a first direction. The first sub-light shield material layer 61*a* and the second sub-light shield material layer 61*b* are disposed at intervals in a second direction (e.g. direction Y). There is an overlapping region between an orthographic projection of the first sub-light shield material layer 61*a* and an orthographic projection of the first reflective layer 62 on the first base 10, and there is an overlapping region between an orthographic projection of the second sub-light shield material layer 61*b* and an orthographic projection of the first reflective layer 62 on the first base 10.

In an exemplary embodiment, as shown in FIG. 7E, the first reflective layer 62 in the first light shield pattern 11 has a first edge 621 and a second edge 622 disposed oppositely in a second direction (e.g. direction Y). The first pixel electrode 13 has a third edge 131 and a fourth edge 132 disposed oppositely in the second direction (e.g. direction Y). The first sub-light shield material layer 61*a* has a seventh edge 613 on a side away from the second sub-light shield material layer 61*b*. The second sub-light shield material layer 61*b* has an eighth edge 614 on a side away from the first sub-light shield material layer 61*a*. The first edge 621, the third edge 131, and the seventh edge 613 are provided on a same side, and the second edge 622, the fourth edge 132, and the eighth edge 614 are provided on a same side.

In an exemplary embodiment, as shown in FIG. 7E, the first edge 621 protrudes from the third edge 131 in a second direction (e.g. direction Y), and the first edge 621 is located on a side of the third edge 131 away from the fourth edge 132. A first distance L1 is formed between the first edge 621 and the third edge 131, which may be greater than or equal to 5 microns, for example, the first distance L1 may be about 5 microns to 50 microns, and for example, the first distance L1 may be about 5 microns to 10 microns.

In an exemplary embodiment, as shown in FIG. 7E, the seventh edge 613 protrudes from the first edge 621 in a second direction (e.g. direction Y), and the seventh edge 613 is located on a side of the first edge 621 away from the fourth edge 132.

In an exemplary embodiment, as shown in FIG. 7E, the second edge 622 protrudes from the fourth edge 132 in a second direction (e.g. direction Y), and the second edge 622 is located on a side of the fourth edge 132 away from the third edge 131. A second distance L2 is formed between the second edge 622 and the fourth edge 132, which may be greater than or equal to 5 microns, for example, the second distance L2 may be about 5 microns to 50 microns, and for example, the second distance L2 may be about 5 microns to 10 microns.

In an exemplary embodiment, as shown in FIG. 7E, the eighth edge 614 protrudes from the second edge 622 in a second direction (e.g. direction Y), and the eighth edge 614 is located on a side of the second edge 622 away from the third edge 131.

In an exemplary embodiment, the structure of the second light shield pattern 21 may be the same as that of the first light shield pattern 11 described above, for example, the structure and positional relationship of the second light shield material layer 71 and the second reflective layer 72 in the second light shield pattern 21 are the same as the structure and positional relationship of the first light shield material layer 61 and the first reflective layer 62 in the first light shield pattern 11. In some embodiments, the structure of the second light shield pattern may also be different from the structure of the first light shield pattern.

The display panel of the exemplary embodiment of the present disclosure can improve the brightness and contrast of the displayed images in the first pixel region and the second pixel region by the above-described structure(s) of the first light shield pattern 11 and the second light shield pattern 21.

In an exemplary embodiment, as shown in FIG. 1, the display units 300 in the display panel of the exemplary embodiment of the present disclosure are rectangular, and the length of one display unit 300 is about 1 cm, and the width of one display unit 300 is about 1 cm. The four display units 300 are disposed in a rectangular manner to form a display unit group. A display panel according to an exemplary embodiment of the present disclosure includes four display unit groups, the four display unit groups are disposed in a rectangular arrangement.

In some embodiments, 10 display units are disposed in a rectangular arrangement to form a display unit group. The display panel includes 10 display unit groups, and the 10 display unit groups are disposed in a rectangular arrangement.

In an exemplary embodiment, as shown in FIG. 6, the display unit 300 further includes a first connection electrode 14 provided on the first base 10, the first connection electrode 14 extends in a second direction (e.g. the direction Y), and is connected to multiple first pixel electrodes 13 in one display unit 300, to reduce resistance of the multiple first pixel electrodes 13. For example, a display unit 300 includes 31 first pixel electrodes 13, and a first connection electrode 14 connects the 31 first pixel electrodes 13 together. An orthographic projection of the first connection electrode 14 does not overlap with the orthographic projections of the second pixel electrode 23 and the common electrode 40 on the first base 10.

In an exemplary embodiment, as shown in FIG. 6, the first connection electrode 14 may be in the same film layer as the first pixel electrode 13, and may be integrally molded using the same material. In some embodiments, the first connection electrode may be located in a different film layer from the first pixel electrode, and be connected with the first pixel electrode by using a via hole.

In an exemplary embodiment, as shown in FIG. 6, the display unit 300 further includes a second connection electrode 24 disposed on the first base 10, and the second connection electrode 24 and the first connection electrode 14 are located on opposite sides of the display unit 300 in a first direction (e.g., direction X). The second connection electrode 24 extends in a second direction (e.g. direction Y) and is connected to multiple second pixel electrodes 23 in one display unit 300, to reduce resistance of the multiple second pixel electrodes 23. For example, a display unit 300 includes 31 second pixel electrodes 23, and a second connection electrode 24 is connected with the 31 second pixel electrodes 23 together. An orthographic projection of the second connection electrode 24 does not overlap with the orthographic projections of the first pixel electrode 13 and the common electrode 40 on the first base 10.

In an exemplary embodiment, as shown in FIG. 6, the second connection electrode 24 may be in the same film layer as the second pixel electrode 23, and may be integrally molded using the same material. In some embodiments, the second connection electrode may be located in a different film layer from the second pixel electrode, and be connected with the second pixel electrode using a via hole.

In an exemplary embodiment, as shown in FIG. 6, the display unit 300 further includes a third connection electrode 41 disposed on the second base 20 and extending in a first direction (e.g. direction X). The third connection electrode 41 is connected to the multiple common electrodes 40 to reduce the resistance of the multiple common electrodes 40. For example, the display unit 300 includes multiple third connection electrodes 41, and the third connection electrode 41 is located between adjacent display units, and may be connected to all common electrodes 40. An orthographic projection of the third connection electrode 41 does not overlap with each of the orthographic projections of the first pixel electrode 13 and the second pixel electrode 23 on the first substrate 10, and the third connection electrode 41 is configured to connect the multiple common electrodes 40 together.

In an exemplary embodiment, as shown in FIG. 6, the third connection electrode 41 may be in the same film layer as the common electrode 40 and may be integrally molded using the same material. In some embodiments, the third connection electrode may be located in a different film layer from the common electrode, and be connected with the common electrode by using a via hole.

In an exemplary embodiment, as shown in FIG. 6, the display unit 300 further includes a first signal line 15 disposed on the first base 10, the first signal line 15 extends in a second direction (for example, direction Y), and the first signal line 15 is connected to multiple first pixel electrodes 13 in one display unit 300, and the first signal line 15 is configured to provide a display signal to the multiple first pixel electrodes 13. For example, one first signal line 15 may be connected to all first pixel electrodes 13 in one display unit 300. An orthographic projection of the first signal line 15 does not overlap with each of the orthographic projections of the second pixel electrode 23 and the common electrode 40 on the first base 10.

In an exemplary embodiment, as shown in FIG. 6, the first signal line 15 may be located in a different film layer from the first pixel electrode 13, the first signal line 15 may be located on a side of the first pixel electrode 13 close to the first base 10, and the first signal line 15 may be connected to the first pixel electrode 13 through the first via 16.

In an exemplary embodiment, as shown in FIG. 6, the display unit 300 further includes a second signal line 25 disposed on the first base 10, and the second signal line 25 and the first signal line 15 are located on opposite sides of the display unit 300 in a first direction (e.g., direction X). The second signal line 25 extends in a second direction (for example, direction Y), and is connected to multiple second pixel electrodes 23 in a display unit 300, and is configured to provide a display signal to multiple second pixel electrodes 23. For example, one second signal line 25 may be connected to all second pixel electrodes 23 in one display unit 300. An orthographic projection of the second signal line 25 does not overlap with each of the orthographic projections of the first pixel electrode 13 and the common electrode 40 on the first base 10.

In an exemplary embodiment, as shown in FIG. 6, the second signal line 25 may be located in a different film layer from the second pixel electrode 23, the second signal line 25 may be located on a side of the second pixel electrode 23 close to the first base 10, and the second signal line 25 may be connected to the second pixel electrode 23 through the second via hole 26.

Figure 8:
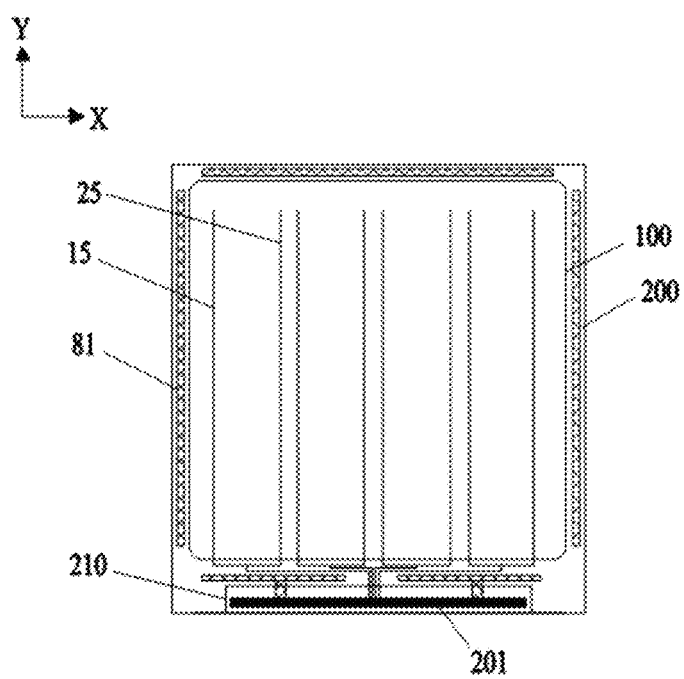
FIG. 8 is a schematic diagram of a structure of a first base in a display panel according to an exemplary embodiment of the present disclosure.

FIG. 8 is a schematic diagram of a structure of a first base in a display panel according to an exemplary embodiment of the present disclosure. In an exemplary embodiment, as shown in FIG. 8, both the first signal line 15 and the second signal line 25 may extend in a second direction (e.g., direction Y) on the first base 10, and both the first signal line 15 and the second signal line 25 may extend to a bonding sub-region 201 in a bonding region 210 of the display panel, and are connected to a bonding terminal in the bonding sub-region 201, which may be connected to an external circuit through a flexible circuit board to achieve input of a display signal. The line widths of both the first signal line 15 and the second signal line 25 may be about 4 microns to 30 microns.

Figure 13:
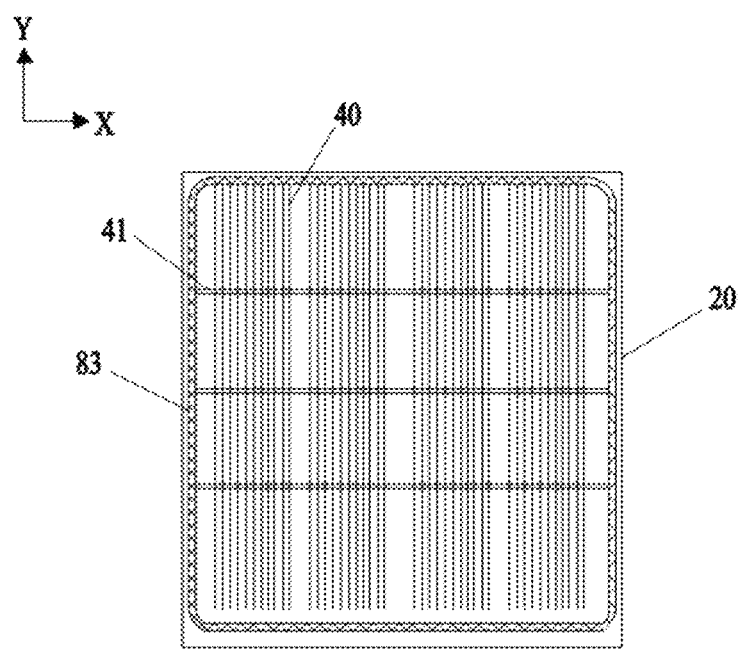
FIG. 13 is a schematic diagram of a structure of a second base in a display panel according to an exemplary embodiment of the present disclosure.

FIG. 13 is a schematic diagram of a structure of a second base in a display panel according to an exemplary embodiment of the present disclosure. In an exemplary embodiment, as shown in FIGS. 1 and 13, a display panel according to an exemplary embodiment of the present disclosure may include multiple display units 300 that may be disposed along a second direction to form a display unit column. A common electrode 40 extends along the second direction, and multiple display units 300 in one display unit column may share at least one common electrode 40. For example, all display units 300 in one display unit column may share multiple common electrodes 40.

In an exemplary embodiment, as shown in FIGS. 8 and 13, the display panel of the exemplary embodiment of the present disclosure further includes a first conductive layer 81, a second conductive layer 83, and a conductive adhesive layer. The first conductive layer 81 is disposed on the first base and located in the peripheral region 200. The second conductive layer 83 is disposed on the second base and is located in the peripheral region 200. The first conductive layer 81 is disposed oppositely to the second conductive layer 83 and, for example, an orthographic projection of the first conductive layer 81 on the first base completely overlaps with an orthographic projection of the second conductive layer on the first base. A conductive adhesive layer is disposed between the first conductive layer 81 and the second conductive layer 83. The conductive adhesive layer includes a conductive gold ball, the conductive adhesive layer bonds the first conductive layer 81 and the second conductive layer, and electrically connects the first conductive layer 81 and the second conductive layer. The first conductive layer 81 is connected to a bonding terminal in the bonding sub-region 201, and the second conductive layer 83 is connected to a common electrode. The orthographic projections of the first conductive layer 81 and the second conductive layer 83 on the first base does not overlap with the bonding region 210.

In the display panel of the exemplary embodiment of the present disclosure, an electric fields need to be generated between the first pixel electrode 13 and the common electrode 40 and between the second pixel electrode 23 and the common electrode 40, to control the liquid crystal deflection in the light adjusting film layer 30. The first pixel electrode 13 and the second pixel electrode 23 on the first base 10 may be connected to the bonding terminal of the bonding sub-region 201 in the bonding region 210 through the first signal line 15 and the second signal line 25, thereby achieving the input of the display signal.

In an exemplary embodiment, the common electrode 40 on the second base 20 may be connected to the bonding terminal of the bonding sub-region 201 in the bonding region 210 through the first conductive layer 81 and the second conductive layer, so that the first pixel electrode 13 and the second pixel electrode 23 achieve the input of display signals. Specifically, the display signal is input by the bonding terminal of the bonding sub-region 201 at first, and then input to the common electrode 40 by sequentially passing through the first lead, the first conductive layer 81, the conductive adhesive layer, the second conductive layer, and the second lead, so that the common electrode 40 achieves inputting of the display signal.

In an exemplary embodiment, both the first base 10 and the second base 20 in the display panel of the exemplary embodiment of the present disclosure may be rectangular as shown in FIGS. 8 and 13. The first conductive layer 81 includes a metal layer and a first conductive film layer which are stacked. The metal layer is located on a side of the first conductive film layer close to the first base 10. The metal layer is used to reduce the resistance of the first conductive layer 81. The first conductive film layer can be better bonded with the conductive adhesive layer.

In an exemplary embodiment, the metal layer may be strip-shaped, the metal layer is located in the four edge regions of the first base 10, and the metal layer is provided with spacing in the four corner regions of the first base 10, i.e., the metal layer is disconnected in the four corner regions of the first base 10. The first conductive film layer may be annular, and the first conductive film layer is disposed around the periphery of the display region. The material of the first conductive film layer may be indium tin oxide.

In some embodiments, the metal layer may be annular, and the metal layer is disposed around the periphery of the display region.

In an exemplary embodiment, as shown in FIG. 13, the second conductive layer 83 may include a second conductive film layer, the second conductive layer 83 is annular, the second conductive layer 83 is disposed around the periphery of the display region, and both the common electrode 40 and the third connection electrode 41 may be connected to the second conductive layer 83. The material of the second conductive layer may be indium tin oxide.

In some embodiments, the second conductive layer may include a metal layer and a second conductive film layer that are stacked, the metal layer is located on a side of the second conductive film layer close to the second base. The first conductive layer may include a first conductive film layer.

Figure 9:
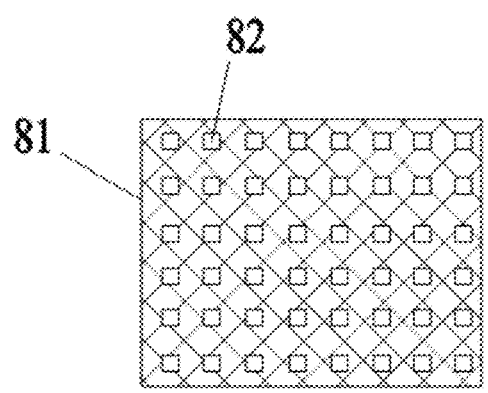
FIG. 9 is an enlarged partial view of a first conductive layer in a display panel according to an exemplary embodiment of the present disclosure.

FIG. 9 is an enlarged partial view of a first conductive layer in a display panel according to an exemplary embodiment of the present disclosure. In an exemplary embodiment, as shown in FIG. 9, a metal layer in the first conductive layer 81 may be provided with multiple through holes 82 capable of providing the light transmittance of the first conductive layer 81. The multiple through holes 82 improve the transmittance of ultraviolet rays and speed up the curing of the conductive adhesive layer during the cell aligning process of the display panel.

In exemplary embodiments, the through hole 82 may adopt a variety of shapes, for example, regular or irregular shapes such as circular, rectangular, diamond, oval, polygon and the like. By way of example, the through hole 82 may be in a shape of rectangular, and the length of the through hole 82 may be about 20 microns to 50 microns, and the width of the through hole 82 may be about 20 microns to 50 microns.

The structure and preparation process of the display panel are exemplarily described with reference to FIGS. 10a to 10f.

The "patterning process" mentioned in the embodiments of the present disclosure includes processings, such as photoresist coating, mask exposure, development, etching and photoresist stripping for metal materials, inorganic materials or transparent conductive materials, and includes processings, such as organic material coating, mask exposure and development for organic materials. The deposition may be any one or more of sputtering, evaporation, and chemical vapor deposition. The coating may be any one or more of spray coating, spin coating, and ink-jet printing. Etching may be any one or more of dry etching and wet etching. The present disclosure is not limited thereto. A "thin film" refers to a layer of thin film formed by a material on a base substrate through deposition, coating, or other processes. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process at least includes one "pattern".

In an exemplary embodiment, the preparation process of the display panel may include the following acts.

(1) A first base is provided.

In an exemplary embodiment, the first base may be a transparent material, for example, the first base may adopt a transparent glass material or a transparent plastic material.

(2) A first signal line and a second signal line are formed.

In an exemplary embodiment, forming the first signal line and the second signal line includes: depositing a first conductive film on the first base, patterning the first conductive film through a patterning process, so that the first signal line and the second signal line disposed on the first base are formed from the first conductive film.

(3) A first light shield material layer is formed.

Figure 10A:
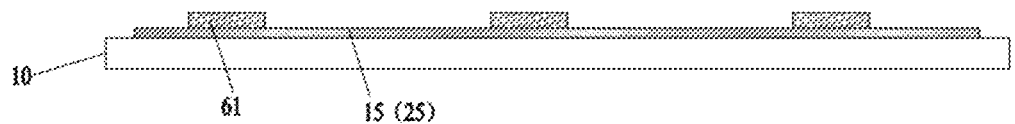
FIG. 10A is a schematic diagram of a pattern after a first light shield material layer is formed during a preparation of a display panel according to an exemplary embodiment of the present disclosure.

In an exemplary embodiment, forming the first light shield material layer includes: depositing a first light shield material film on the first base 10 on which the foregoing pattern is formed, patterning the first light shield material film through a patterning process, so that a first light shield material layer 61 disposed on the first base 10 is formed from the first light shield material film, as shown in FIG. 10A. Herein, a thickness of the first light shield material layer 61 may be about 1 micron to 2 microns.

(4) A first reflective layer is formed.

Figure 10B:
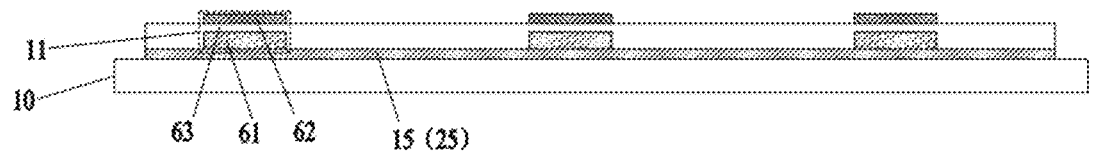
FIG. 10B is a schematic diagram of a pattern after a first reflective layer is formed during a preparation of a display panel according to an exemplary embodiment of the present disclosure.

In an exemplary embodiment, forming a first reflective layer includes: sequentially depositing a first dielectric film and a first metal film on a first base 10 on which the aforementioned patterns are formed, patterning the first dielectric film and the first metal film through a patterning process, so that a first dielectric material layer 63 covering the first light shield material layer is formed from the first dielectric film, and a first reflective layer 62 disposed on the first dielectric material layer 63 is formed from the first metal film, as shown in FIG. 10B. The first light shield material layer 61 and the first reflective layer 62 form a first light shield pattern 11.

(5) A first pixel electrode and a second pixel electrode are formed.

Figure 10C:
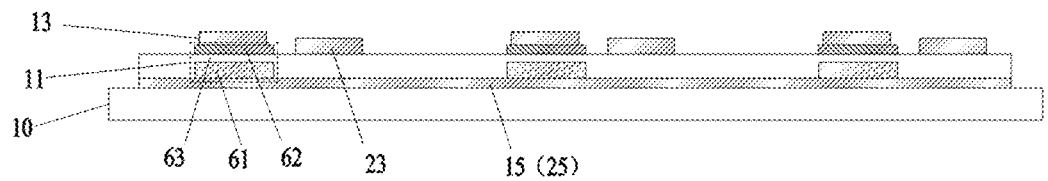
FIG. 10C is a schematic diagram of a pattern after a first pixel electrode and a second pixel electrode are formed during a preparation of a display panel according to an exemplary embodiment of the present disclosure.

In an exemplary embodiment, forming the first pixel electrode and the second pixel electrode includes: depositing a second conductive film on the first base 10 on which the aforementioned patterns are formed, and patterning the second conductive film through a patterning process, so that the first pixel electrode 13 and the second pixel electrode 23 are formed from the second conductive film, as shown in FIG. 10C. An orthographic projection of the first light shield pattern 11 overlaps with an orthographic projection of the first pixel electrode 13 on the first base 10, and the orthographic projection of the first light shield pattern 11 does not overlap with an orthographic projection of the second pixel electrode 23 on the first base 10. The first pixel electrode 13 and the second pixel electrode 23 may adopt transparent electrodes such as ITO or the like.

(6) A first alignment layer is formed.

In an exemplary embodiment, forming a first alignment layer includes: depositing a first alignment material film on a first base 10 on which the patterns are formed, patterning the first alignment material film through a patterning process, so that a first alignment layer is formed from the first alignment material film, and alignment of the first alignment layer is completed by a rubbing or optical alignment technique.

(7) A second base is provided.

In an exemplary embodiment, an alignment mark layer is formed on the second base. The second base may be made of a transparent material, for example, the second base may be made of a transparent glass material or a transparent plastic material.

(8) A second light shield material layer is formed.

Figure 10D:
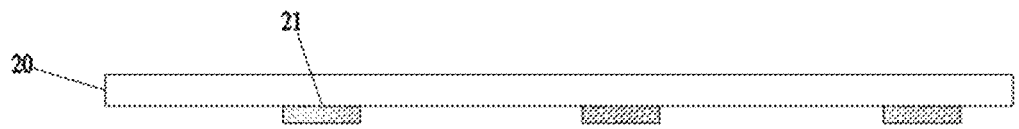
FIG. 10D is a schematic diagram of a pattern after a second light shield material layer is formed during a preparation of a display panel according to an exemplary embodiment of the present disclosure.

In an exemplary embodiment, forming the second light shield material layer includes: depositing a second light shield material film on the second base 20 on which the aforementioned patterns are formed, patterning the second light shield material film through a patterning process, so that a second light shield material layer 71 disposed on the second base 20 is formed from the second light shield material film, as shown in FIG. 10D. Herein, a thickness of the second light shield material layer 71 may be about 1 micron to 2 microns.

(9) A second reflective layer is formed.

Figure 10E:
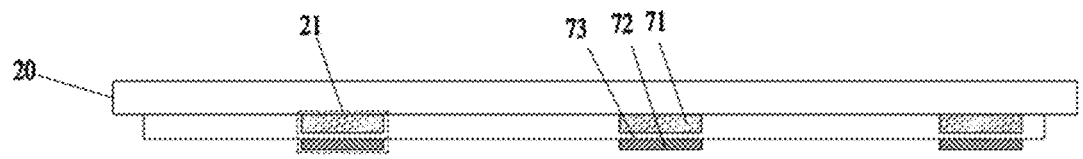
FIG. 10E is a schematic diagram of a pattern after a second reflective layer is formed during a preparation of a display panel according to an exemplary embodiment of the present disclosure.

In an exemplary embodiment, forming a second reflective layer includes: sequentially depositing a second dielectric film and a second metal film on a second base 20 on which the aforementioned patterns are formed, patterning the second dielectric film and the second metal film through a patterning process, so that a second dielectric material layer 73 covering the second light shield material layer is formed from the second dielectric film, and a second reflective layer 72 disposed on the second dielectric material layer 73 is formed from the second metal film, as shown in FIG. 10E. The second light shield material layer 71 and the second reflective layer 72 form a second light shield pattern 21.

(10) A common electrode is formed.

Figure 10F:
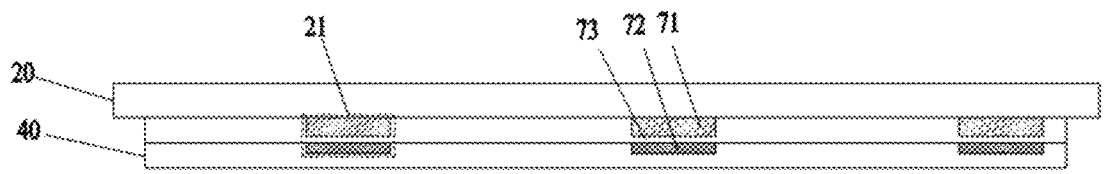
FIG. 10F is a schematic diagram of a pattern after a common electrode is formed during a preparation of a display panel according to an exemplary embodiment of the present disclosure.

In an exemplary embodiment, forming the common electrode includes: depositing a third conductive film on the second base 20 on which the aforementioned patterns are formed, and patterning the third conductive film through a patterning process, so that the common electrode 40 is formed from the third conductive film, as shown in FIG. 10F.

Herein, the common electrode 40 may be a transparent electrode such as ITO or the like.

(11) A second alignment layer is formed.

In an exemplary embodiment, forming a second alignment layer includes: depositing a second alignment material film on the second base 20 on which the aforementioned patterns are formed, patterning the second alignment material film through a patterning process, so that the second alignment layer is formed from the second alignment material film, and alignment of the second alignment layer is completed by a rubbing or optical alignment technique.

(12) The first base and the second base are cell aligned.

In an exemplary embodiment, cell aligning the first base with the second base includes: aligning the first base with the second base through an alignment mark layer on the second base, and then dripping liquid crystal between the first base and the second base through an ODF or VIF process to form a liquid crystal cell; then, irradiating the liquid crystal with ultraviolet (UV), which may be direct irradiation with ultraviolet (UV) or selective irradiation with ultraviolet (UV), so that the irradiated liquid crystal can polymerize to form polymer network and finally form polymer stabilized liquid crystal (PSLC). In some embodiments, the liquid crystal may be formed into a polymer stabilized liquid crystal (PSLC) by thermal polymerization, infrared polymerization or the like. Herein, the liquid crystal cell has a thickness of about 2 microns to 10 microns, and for example, the liquid crystal cell has a thickness of about 2 microns to 6 microns to balance the driving voltage.

Figure 12:
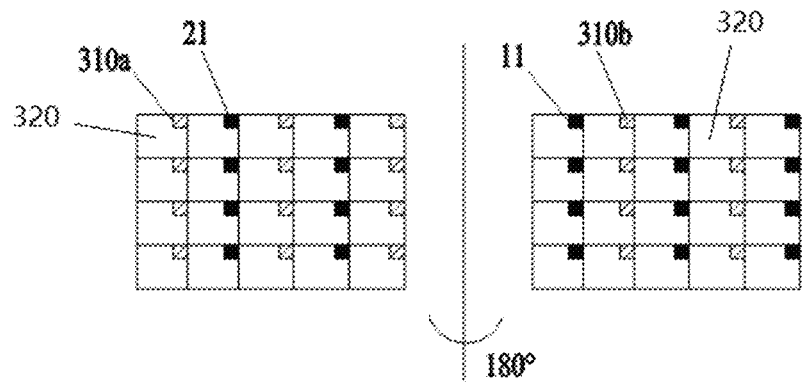
FIG. 12 is a second schematic diagram of a planar structure of a display panel according to an exemplary embodiment of the present disclosure.

FIG. 12 is a second schematic diagram of a planar structure of a display panel according to an exemplary embodiment of the present disclosure. In an exemplary embodiment, as shown in FIG. 12, the display panel according to the exemplary embodiment of the present disclosure may be an active matrix (AM) liquid crystal display panel. The display panel according to an exemplary embodiment of the present disclosure includes at least one first pixel region 310a, at least one second pixel region 310b, and a light transmitting region 320.

In an exemplary embodiment, the first pixel region 310a may include a first base, a second base disposed oppositely, and a light adjusting film layer disposed between the first base and the second base. The first pixel region 310a may further include a first drive circuit disposed on a side of the first base close to the light adjusting film layer, a first light shield pattern disposed on a side of the first drive circuit close to the light adjusting film layer, a first pixel electrode disposed on a side of the first light shield pattern close to the light adjusting film layer, and a common electrode disposed on a side of the second base close to the light adjusting film layer. Herein, the structure of the first light shield pattern in the display panel of the exemplary embodiment of the present disclosure is the same as that of the first light shield pattern in the aforementioned display panel, and the present disclosure is not repeated herein.

In an exemplary embodiment, a first drive circuit in the first pixel region 310a is connected to the first pixel electrode to provide a display signal to the first pixel electrode. The first drive circuit may include a first gate electrode, a first active layer and a first source-drain electrode sequentially disposed on the first base. The first gate electrode and the first active layer are separated by providing a gate insulating layer, the first active layer and the first source-drain electrode are separated by providing a blocking layer, the first source-drain electrode and the first light shading pattern are separated by providing a passivation layer, and the first source-drain electrode and the first pixel electrode are separated by providing a first planarization layer.

In an exemplary embodiment, the second pixel region 310*b* may include a first base, a second base disposed oppositely, and a light adjusting film layer disposed between the first base and the second base. The second pixel region 310*b* may further include a second drive circuit disposed on a side of the first base close to the light adjusting film layer, a second pixel electrode disposed on a side of the second drive circuit close to the light adjusting film layer, a second light shield pattern disposed on a side of the second base close to the light adjusting film layer, and a common electrode disposed on one side of the second light shield pattern close to the light adjusting film layer. Herein the second light shield pattern in the display panel of the exemplary embodiment of the present disclosure has the same structure as the second light shield pattern in the aforementioned display panel, and the present disclosure is not repeated herein.

In an exemplary embodiment, the second drive circuit in the second pixel region 310*b* is connected to the second pixel electrode to provide a display signal to the second pixel electrode. The second drive circuit may include a second gate electrode, a second active layer and a second source-drain electrode sequentially disposed on the first base. The second gate electrode and the second active layer are separated by providing a gate insulating layer, the second active layer and the second source-drain electrode are separated by providing a blocking layer, and the second source-drain electrode and the second pixel electrode are separated by providing a second planarization layer.

On the second base side of the display panel of the exemplary embodiment of the present disclosure, the first pixel region 310*a* can display an image, and the second light shield pattern 21 shields the second pixel region 310*b*, so that the second pixel region 310*b* does not display an image. On the first base side of the display panel of the exemplary embodiment of the present disclosure, the second pixel region 310*b* can display an image, and the first light shield pattern 11 shields the first pixel region 310*a*, so that the first pixel region 310*a* does not display an image.

The display panel of the exemplary embodiment of the present disclosure can achieve transparent display of different pictures and colors displayed on both sides by reducing the resolution by half. For example, on the second base 20 side of the display panel of the exemplary embodiment of the present disclosure, the aperture ratio of the first pixel region 310*a* is 10%, and the transmittance thereof is 50%.

In an exemplary embodiment, the display panel according to the exemplary embodiment of the present disclosure further includes a spacer disposed between the first base and the second base, which separates the first base and the film layer thereon from the second base and the film layer thereon.

Taking the first drive circuit and the second drive circuit each including an oxide type thin film transistor as an example, the preparation process of the display panel of the exemplary embodiment of the present disclosure includes the following acts.

(1) Forming a first gate and a second gate on a first base, forming a gate insulating layer on a side of the first gate and the second gate away from the first base, forming a first active layer and a second active layer on a side of the gate insulating layer away from the first base, forming a blocking layer on a side of the first active layer and the second active layer away from the first base, forming a first source-drain electrode and a second source-drain electrode on a side of the blocking layer away from the first base, forming a passivation layer on a side of the first source-drain electrode and the second source-drain electrode away from the first base, forming a first light shield pattern on a side of the passivation layer away from the first base, forming a first planarization layer on a side of the first light shield pattern away from the first base, forming a first pixel electrode and a second pixel electrode on a side of the first planarization layer away from the first base, and forming a first alignment layer on a side of the first pixel electrode and the second pixel electrode away from the first base.

(2) Forming an alignment mark layer on the second base, forming a second light shield pattern on a side of the alignment mark layer away from the second base, forming a second planarization layer on a side of the second light shield pattern away from the second base, forming a common electrode on a side of the second planarization layer away from the second base, forming a spacer on a side of the common electrode away from the second base, and forming a second alignment layer on a side of the common electrode away from the first base.

(3) Aligning the first base and its film structure thereon with the second base and its film structure thereon, dripping liquid crystal between the first base and the second base through ODF or VIF process to form a liquid crystal cell; then, irradiating the liquid crystal with ultraviolet (UV), which may be direct irradiation with ultraviolet (UV) or selective irradiation with ultraviolet (UV), so that the irradiated liquid crystal polymerizes to form polymer network and finally forms polymer stabilized liquid crystal (PSLC). Herein, the liquid crystal cell has a thickness of about 2 microns to 10 microns, and for example, the liquid crystal cell has a thickness of about 2 microns to 6 microns to balance the driving voltage.

The present disclosure further provides a display apparatus including the display panel of the aforementioned exemplary embodiments. The display apparatus may be any product or component with a display function, such as a mobile phone, a tablet computer, a television, a display, a laptop computer, a digital photo frame, or a navigator.

The present disclosure further provides a method for preparing a display panel, which includes:
  forming a first light shield material layer on the first base;
  forming a first reflective layer on a side of the first light shield material layer away from the first base, and forming a first light shield pattern with the first shield material layer and the first reflective layer;
  forming a first pixel electrode on a side of the first reflective layer away from the first base, so that an orthographic projection of the first light shield pattern overlaps with an orthographic projection of the first pixel electrode on the first base;
  cell aligning the first base with the second base; and
  forming a light adjusting film layer between the first base and the second base;
  wherein, the first reflective layer is configured to emit incident light towards the direction of the light adjusting film layer; and the first light shield material layer is configured to shield ambient light reflected by the first reflective layer.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementations without departing from the spirit and scope of the present disclosure. However, the patent protection scope of the present invention should be subject to the scope defined by the appended claims.

The invention claimed is:

1. A display panel, comprising at least one display unit which comprises at least one first pixel region, at least one second pixel region and at least one light transmitting region, wherein a first pixel region is configured to display an image on a first side of the display panel; a second pixel region is configured to display an image on a second side of the display panel; a light transmitting region is configured to transmit light;
the at least one display unit comprises:
a first base, located in the first pixel region, the second pixel region and the light transmitting region;
a second base, disposed opposite to the first base and located in the first pixel region, the second pixel region and the light transmitting region;
a light adjusting film layer, disposed between the first base and the second base and located in the first pixel region, the second pixel region and the light transmitting region;
at least one first light shield pattern, disposed on a side of the first base close to the light adjusting film layer and located in the first pixel region;
at least one first pixel electrode, disposed on a side of the first light shield pattern close to the light adjusting film layer and located in the first pixel region, wherein an orthographic projection of the at least one first light shield pattern overlaps with an orthographic projection of the at least one first pixel electrode on the first base;
at least one second pixel electrode, disposed on a side of the first base close to the light adjusting film layer and located in the second pixel region;
at least one second light shield pattern, disposed on a side of the second base close to the light adjusting film layer and located in the second pixel region, wherein an orthographic projection of the at least one second light shield pattern overlaps with an orthographic projection of the at least one second pixel electrode on the first base; and
at least one common electrode, disposed on a side of a second light shield pattern close to the light adjusting film layer and located in the first pixel region, the second pixel region and the light transmitting region, wherein an orthographic projection of the at least one common electrode overlaps with each of orthographic projections of the at least one first pixel electrode and the at least one second pixel electrode on the first base.

2. The display panel according to claim 1, wherein the at least one first light shield pattern comprises a first light shield material layer and a first reflective layer, the first reflective layer is located on a side of the first light shield material layer close to the light adjusting film layer, and the first reflective layer is configured to emit incident light towards a direction of the light adjusting film layer; the first light shield material layer is configured to shield ambient light reflected by the first reflective layer.

3. The display panel according to claim 2, wherein the first reflective layer extends along a first direction, the first reflective layer has a first edge and a second edge disposed oppositely in a second direction, the first pixel electrode extends along the first direction, the first pixel electrode has a third edge and a fourth edge disposed oppositely in the second direction, the first edge and the third edge are disposed on a same side, the second edge and the fourth edge are disposed on a same side, the first edge protrudes from the third edge in the second direction, the second edge protrudes from the fourth edge in the second direction, and the first direction intersects with the second direction.

4. The display panel according to claim 3, wherein a first distance is formed between the first edge and the third edge, and the first distance is greater than or equal to 5 microns; or
a second distance is formed between the second edge and the fourth edge, and the second distance is greater than or equal to 5 microns.

5. The display panel according to claim 2, wherein the first reflective layer extends along a first direction, the first reflective layer has a first edge and a second edge disposed oppositely in a second direction, the first light shield material layer extends along the first direction, the first light shield material layer has a fifth edge and a sixth edge disposed oppositely in the second direction, the first edge and the fifth edge are disposed on a same side, the second edge and the sixth edge are disposed on a same side, the fifth edge protrudes from the first edge in the second direction, the sixth edge protrudes from the second edge in the second direction, and the first direction intersects with the second direction.

6. The display panel according to claim 5, wherein a third distance is formed between the fifth edge and the first edge, and the third distance is greater than or equal to 5 microns; or
a fourth distance is formed between the sixth edge and the second edge, and the fourth distance is greater than or equal to 5 microns.

7. The display panel according to claim 2, wherein the first reflective layer extends along a first direction, the first reflective layer has a first edge and a second edge disposed oppositely in a second direction, the first light shield material layer extends along the first direction, the first light shield material layer has a fifth edge and a sixth edge disposed oppositely in the second direction, the first edge and the fifth edge are disposed on a same side, the second edge and the sixth edge are disposed on a same side, the first edge protrudes from the fifth edge in the second direction, the sixth edge protrudes from the second edge in the second direction, and the first direction intersects with the second direction.

8. The display panel according to claim 2, wherein the first reflective layer extends along a first direction, the first reflective layer has a first edge and a second edge disposed oppositely in a second direction, the first light shield material layer comprises a first sub-light shield material layer and a second sub-light shield material layer both extending along the first direction, the first sub-light shield material layer and the second sub-light shield material layer are disposed at intervals along the second direction, the first sub-light shield material layer has a seventh edge on a side away from the second sub-light shield material layer, the second sub-light shield material layer has an eighth edge on a side away from the first sub-light shield material layer, the first edge and the seventh edge are disposed on a same side, the second edge and the eighth edge are on a same side, the seventh edge protrudes from the first edge in the second direction, and the eighth edge protrudes from the second edge in the second direction, and the first direction intersects with the second direction.

9. The display panel according to claim 2, wherein a surface of the first reflective layer on a side close to the light adjusting film layer is planar;
or a surface of the first reflective layer close to the light adjusting film layer is a concave-convex surface.

10. The display panel according to claim 9, wherein the first reflective layer comprises a plurality of metal particles forming the concave-convex surface on a side of the first reflective layer close to the light adjusting film layer.

11. The display panel according to claim 2, wherein the at least one first light shield pattern further comprises a first dielectric material layer disposed between the first light shield material layer and the first reflective layer.

12. The display panel according to claim 1, wherein the at least one display unit comprises a plurality of first pixel electrodes and a plurality of second pixel electrodes, the plurality of first pixel electrodes and the plurality of second pixel electrodes are all in a line shape, the plurality of first pixel electrodes and the plurality of second pixel electrodes are all extended along a first direction, the plurality of first pixel electrodes and the plurality of second pixel electrodes are alternately disposed along a second direction to form an interdigital structure, and the first direction intersects with the second direction.

13. The display panel according to claim 12, further comprising at least one first signal line disposed on the first base, wherein the at least one first signal line extends along the second direction, and the at least one first signal line is connected to the plurality of first pixel electrodes;
or
further comprising at least one second signal line disposed on the first base, wherein the at least one second signal line extends along the second direction, and the at least one second signal line is connected to the plurality of second pixel electrodes.

14. The display panel according to claim 12, further comprising at least one first connection electrode disposed on the first base, wherein the at least one first connection electrode extends along the second direction, and the at least one first connection electrode is connected to the plurality of first pixel electrodes;
or
further comprising at least one second connection electrode disposed on the first base, wherein the at least one second connection electrode extends along the second direction, and the at least one second connection electrode is connected to the plurality of second pixel electrodes.

15. The display panel according to claim 1, wherein the at least one display unit comprises a plurality of common electrodes, all of which are in a line shape and extend along a second direction, and the plurality of common electrodes are disposed at intervals along a first direction, and the first direction intersects with the second direction.

16. The display panel according to claim 15, further comprising at least one third connection electrode disposed on the second base, wherein the at least one third connection electrode extends along the first direction, and the at least one third connection electrode is connected to the plurality of common electrodes.

17. The display panel according to claim 1, wherein the display panel comprises a plurality of display units, the display units are rectangular, and a distance between edges of adjacent display units is 1 mm to 2 mm.

18. The display panel according to claim 1, wherein the display panel comprises a display region, a peripheral region and a bonding region that are disposed outside the display region, and the display panel further comprises a first conductive layer, a second conductive layer and a conductive adhesive layer, wherein the first conductive layer is disposed on the first base and located in the peripheral region, the second conductive layer is disposed on the second base and located in the peripheral region, the first conductive layer is disposed opposite to the second conductive layer, the conductive adhesive layer is disposed between the first conductive layer and the second conductive layer, the at least one common electrode is connected with the second conductive layer, and the first conductive layer is connected with the bonding region.

19. The display panel according to claim 18, wherein the first conductive layer comprises a metal layer and a first conductive film layer that are stacked, and the metal layer is located on a side of the first conductive film layer close to the first base.

20. The display panel according to claim 19, wherein the metal layer is strip-shaped, the metal layer is located in an edge region of the first base, and the metal layer is provided with spacing in a corner region of the first base; or, the metal layer is annular, and the metal layer is disposed around periphery of the display region;
or
a plurality of through holes are provided in the metal layer.

21. The display panel according to claim 1, wherein the second light shield pattern comprises a second light shield material layer and a second reflective layer, the second reflective layer is located on a side of the second light shield material layer close to the light adjusting film layer, and the second reflective layer is configured to emit incident light towards a direction of the light adjusting film layer; and the second light shield material layer is configured to shield ambient light reflected by the second reflective layer.

22. A display apparatus, comprising the display panel according to claim 1.

23. A method for preparing a display panel, wherein the display panel comprises at least one display unit comprising at least one first pixel region, at least one second pixel region and at least one light transmitting region, a first pixel region is configured to display an image on a first side of the display panel; a second pixel region is configured to display an image on a second side of the display panel; a light transmitting region is configured to transmit light, and the method for preparing the display panel comprises:
forming at least one first light shield pattern on the first base, to enable the at least one first light shield pattern to be located in the first pixel region;
forming at least one first pixel electrode on a side of the at least one first light shield pattern away from the first base, to enable the at least one first pixel electrode to be located in the first pixel region, wherein an orthographic projection of the at least one first light shield pattern overlaps with an orthographic projection of the at least one first pixel electrode on the first base;
forming at least one second pixel electrode on the first base, to enable the at least one second pixel electrode to be located in the second pixel region;
forming at least one second light shield pattern on the second base, to enable the at least one second light shield pattern to be located in the second pixel region, wherein an orthographic projection of the at least one second light shield pattern overlaps with an orthographic projection of the at least one second pixel electrode on the first base;
forming at least one common electrode on a side of the second light shield pattern away from the second base, to enable the at least one common electrode to be located in the first pixel region, the second pixel region and the light transmitting region, wherein an orthographic projection of the at least one common electrode overlaps with each of orthographic projections of the at least one first pixel electrode and the at least one second pixel electrode on the first base;

cell aligning the first base with the second base; and forming a light adjusting film layer between the first base and the second base.

\* \* \* \* \*